(12) United States Patent
Thubert et al.

(10) Patent No.: US 9,413,638 B2
(45) Date of Patent: Aug. 9, 2016

(54) GENERATING A LOOP-FREE ROUTING TOPOLOGY BASED ON MERGING BUTTRESSING ARCS INTO ROUTING ARCS

(75) Inventors: Pascal Thubert, La Colle sur Loup (FR); Patrice Bellagamba, Saint Raphael (FR)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 13/467,603

(22) Filed: May 9, 2012

(65) Prior Publication Data

US 2013/0301470 A1 Nov. 14, 2013

(51) Int. Cl.
*H04L 12/26* (2006.01)
*H04L 12/705* (2013.01)
*H04L 12/735* (2013.01)
*H04L 12/751* (2013.01)
*H04L 12/707* (2013.01)

(52) U.S. Cl.
CPC ............... *H04L 45/18* (2013.01); *H04L 45/02* (2013.01); *H04L 45/128* (2013.01); *H04L 45/22* (2013.01); *H04L 45/24* (2013.01)

(58) Field of Classification Search
CPC ....... H04L 45/22; H04L 45/28; H04L 45/128; H04L 45/02; H04L 45/24; H04L 45/20; H04L 45/16; H04L 45/18; H04L 45/1283
USPC ......... 370/217, 218, 228, 254–258, 222, 238; 709/239, 241
See application file for complete search history.

(56) References Cited

U.S. PATENT DOCUMENTS

| | | | |
|---|---|---|---|
| 7,656,857 | B2 | 2/2010 | Thubert et al. |
| 7,801,031 | B2 | 9/2010 | Chao et al. |
| 7,830,786 | B2 * | 11/2010 | Atlas et al. ............... 370/217 |
| 7,876,672 | B2 * | 1/2011 | Chao et al. ............... 370/218 |

(Continued)

FOREIGN PATENT DOCUMENTS

WO 0229427 A1 4/2002

OTHER PUBLICATIONS

Nelakuditi et al., "Fast Local Rerouting for Handling Transient Link Failures", [online], 2007 [retrieved on Oct. 5, 2010]. Retrieved from the Internet: <URL:http://www.google.com/url?sa=t&source=web&cd=1&ved=0CBkQFjAA&url=http%3A%2F%2Fciteseerx.ist.psu.edu%2Fviewdoc%2Fdownload%3Fdoi%3D10.1.1.98.5714%26rep%3Drep1%26type%3Dpdf&rct=j&q=%22Fast%20Local%20Rerouting%20for%20Handling%20Transient%20Link% 20Failures%22%20&ei=JDKrTNO_MoPtOfeipYMH&usg=AFQjCNGumjLmao_9ld5Weu4t0elEhqavmA&sig2=crvLBVIfiA6AE8f_jYoGsA&cad=rja>, pp. 1-14.*

(Continued)

*Primary Examiner* — Kwang B Yao
*Assistant Examiner* — Harun Chowdhury
(74) *Attorney, Agent, or Firm* — Leon R. Turkevich

(57) ABSTRACT

In one embodiment, a method comprises creating, in a computing network, a loop-free routing topology comprising a plurality of routing arcs for reaching a destination device, each routing arc routing any network traffic along the routing arc toward the destination device via any one of first or second ends of the corresponding routing arc, the creating including forming a buttressing arc having an originating end joined to a first of the routing arcs and a terminating end joined to a second of the routing arcs, the buttressing arc inheriting from the first routing arc a first height to the destination device, the first height of the first routing arc higher than a corresponding second height of the second routing arc; and causing the network traffic to be forwarded, to the destination device, via the buttressing arc and at least one of the first routing arc or the second routing arc.

20 Claims, 19 Drawing Sheets

(56) References Cited

U.S. PATENT DOCUMENTS

| | | | |
|---|---|---|---|
| 2002/0176371 | A1 | 11/2002 | Bahzadi |
| 2003/0046426 | A1 | 3/2003 | Nguyen |
| 2004/0042473 | A1* | 3/2004 | Park et al. ............... 370/408 |
| 2007/0091811 | A1 | 4/2007 | Thubert et al. |
| 2008/0181133 | A1* | 7/2008 | Thubert et al. ............ 370/255 |
| 2010/0172237 | A1* | 7/2010 | Savage et al. ............ 370/228 |
| 2010/0188979 | A1 | 7/2010 | Thubert et al. |
| 2010/0246480 | A1* | 9/2010 | Aggarwal et al. ......... 370/328 |
| 2012/0300668 | A1 | 11/2012 | Thubert et al. |

OTHER PUBLICATIONS

U.S. Appl. No. 13/371,065, filed Feb. 10, 2012.

Winter, Ed., et al., "RPL: Routing Protocol for Low-Power and Lossy Networks", [online], Mar. 2012, [retrieved on Nov. 26, 2012]. Internet Engineering Task Force, Request for Comments: 6550, ISSN 2070-1721. Retrieved from the Internet: <URL: http://tools.ietf.org/pdf/rfc6550>, pp. 1-157.

PCT/US12/39039 International Search Report, Aug. 24, 2012.

Cho et al., "Resilient multipath routing with independent directed acyclic graphs", Proceedings of IEEE International Conference on Communications (ICC), [online], May 2010, [retrieved on Oct. 30, 2012]. Retrieved from the Internet: <URL: http://ieeexplore.ieee.org/stamp/stamp.jsp?tp=&arnumber=5502526>, 5 pages.

Cho et al., Independent Directed Acyclic Graphs for Resilient Multipath Routing:, IEEE/ACM Transactions on Networking, vol. 1, No. 20, [online], Feb. 20, 2012, [retrieved on Oct. 24, 2012]. Retrieved from the Internet: <URL: http://srini.ca/p/Srini-2011-TON-IDAGS.pdf>, pp. 153-162

Erlebach et al., "Path Splicing with Guaranteed Fault Tolerance", IEEE Globecom 2009 Proceedings, [online], [retrieved on Oct. 23, 2012]. Retrieved from the Internet: <URL: http://202.194.20.8/proc/GLOBECOM2009/DATA/PID960701.PDF>, 6 pages.

Erlerbach et al., "Path Splicing with Guaranteed Fault Tolerance", Dynamo 2009, Dagstuhl, Germany, [online], [retrieved on Nov. 26, 2012]. Retrieved from the Internet: <URL: http://cost295.lboro.ac.uk/docs/dagstuhl/files/erlebach.pdf>, 52 pages.

Atlas, Ed., "An Architecture for IP/LDP Fast-Reroute Using Maximally Redundant Trees", [online], Mar. 12, 2012, Retrieved from the Internet: <URL: http://tools.ietf.org/pdf/draft-ietf-rtgwg-mrt-frr-architecture-01.pdf>, pp. 1-25.

Alia Atlas et al., "U-turn Alternates for IP/LDP Local Protection", Internet Draft, draft-atlas-ip-local-protect-uturn-00. txt, May 1, 2004, pp. 1-29 (32 pages).

Thubert et al., "Available Routing Constructs", draft-thubert-rtgwg-arc-00, Internet Engineering Task Force, IETF, Oct. 2, 2012, pp. 1-19.

Atlas, Ed., "U-turn Alternates for IP/LDP Local Protection", [online], Jul. 8, 2004 [retrieved on Apr. 11, 2011] Network Working Group, Internet-Draft, <draft-atlas-ip-local-protect-uturn-00>. Retrieved from the Internet: <URL: http://tools.ietf.org/html/draft-atlas-ip-local-protect-uturn-00>, pp. 1-30.

Atlas, Ed., "U-turn Alternates for IP/LDP Fast-Reroute", [online], Feb. 2006, [retrieved on Sep. 28, 2010] Network Working Group, Internet-Draft, <draft-atlas-ip-local-protect-uturn-03>. Retrieved from the Internet: <URL: http://tools.ietf.org/html/draft-atlas-ip-local-protect-uturn-03>, pp. 1-29.

Winter, Ed., "RPL: Routing Protocol for Low Power and Lossy Networks", [online], Aug. 3, 2009, [retrieved on Apr. 11, 2011]. Network Working Group, Internet-Draft, <draft-ietf-roll-rpl-00>. Retrieved from the Internet: <URL: http://tools.ietf.org/html/draft-ietf-roll-rpl-00>, pp. 1-69.

Atlas, Ed. et al., "Basic Specification for IP Fast Reroute: Loop-Free Alternates", [online], Sep. 2008, [retrieved on Aug. 17, 2010]. Network Working Group, Request for Comments: 5286. Retrieved from the Internet <URL: http://tools.ietf.org/html/rfc5286>, pp. 1-31.

Filsfils et al., "LFA applicability in SP networks", [online], Mar. 1, 2010, [retrieved on Aug. 29, 2011]. Network Working Group, Internet-Draft, <draft-filsfils-rtgwg-lfa-applicability-00>. Retrieved from the Internet <URL: http://tools.ietf.org/html/draft-filsfils-rtgwg-lfa-applicability-00>, pp. 1-28.

U.S. Appl. No. 13/113,113, filed May 23, 2011.

\* cited by examiner

Arc Rules:

1) New Arc must Terminate in Existing Arc or Final Destination.

2) New Arc made up of Nodes not Already in an Arc.

3) Height (e.g., "H2") of New Arc (e.g., A2) (i.e., Distance to Destination Root) Must be Strictly More than the height (e.g., "H1") of the Existing Arc (e.g., A1) that the New Arc Terminates into (i.e., H2 > H1).

4) New Buttressing Arc (A3) may be formed by attaching to the Higher End of a Second Existing Arc (A2) if the Lower End of the Second Existing Arc (e.g., C of A2) terminates in a Third Arc (e.g., A1) having a height (H1) Strictly Lower than the Height (H2) of the Existing Arc A2 (i.e., H1<H2).

5) The Height of any Comb (i.e., Arcs having 1 or more Buttressing Arcs) is Applied to the Height of the Last Added Buttressing Arc (Height Inheritance)

Example Sequence of Arcs, Paths for R:

A1: Root Arc A-C-F-J-K-B -- A, C, F, J, K, B each can advertise H1=1

A2: Collapsed Arc C-E-F -- E can advertise H=2

A3: Buttressing Arc *E-H-F -- H can advertise H3=2: Merge w/A2 into Merged Arc MA0 (C-E-H-F, Cursor Node E)

A4: Buttressing Arc *E-D-A -- D can advertise H4=2: Merge w/ MA0 into MA1 (A, D, C, E, H, F; Cursor Node E)

A5: Buttressing Arc *H-I-F -- I can advertise H5=2: Merge w/MA1 into MA2 (A, D, C, E, H, I, F; Cursor Node E)

P6: Add Buttressing Path D-C to MA3

A7: Collapsed Arc K-M-J (Height H7=2) -- M can advertise H7=2

A8: Collapsed D-L-E (Height H8=3) L can advertise H8=3

A9: Collapsed Arc H-G-E (Height H9=3) -- G can advertise H9=3

Figure 5

GENERATING A LOOP-FREE ROUTING TOPOLOGY BASED ON MERGING BUTTRESSING ARCS INTO ROUTING ARCS

TECHNICAL FIELD

The present disclosure generally relates to generating a loop-free routing topology in a computing network, such as an Internet Protocol (IP) network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Existing routing protocols assume recalculation of routes can be performed in response to a detected failure (e.g., loss of a link or a connecting network node); however, recalculation of routes requires computation time that likely results in a loss of data traffic. One attempt to accelerate responding to a detected failure includes "Loop Free Alternates" (LFA), where a router can respond to losing a next hop router in a path to a destination node by identifying a feasible successor for reaching the destination node, as long as the feasible successor does not create a loop by sending the packet back to the router. The IETF Draft by Atlas, entitled "U-turn Alternates for IP/LDP Local Protection (draft-atlas-ip-local-protect-uturn-00.txt)", illustrates in FIG. 3 a network topology where LFA solutions can be provided for the network nodes N2, N4, and R3 to forward a data packet to the destination node D in the event of a failed link, however, LFA cannot provide any solutions for any of the network nodes N3, S, P, R1, or R2. The IETF Draft by Atlas proposed a "U-turn protocol" to reverse a link, however the U-turn protocol cannot provide any solution for the nodes P, R1, or R2 of FIG. 3 in the event of a link failure.

Another proposed routing protocol, referred to as "Fast Local Rerouting for Handling Transient Link Failures" (FIR) requires a complete recalculation of routes in response to a link failure, hence recalculation of routes requires computation time that likely results in a loss of data traffic.

BRIEF DESCRIPTION OF THE DRAWINGS

Reference is made to the attached drawings, wherein elements having the same reference numeral designations represent like elements throughout and wherein:

FIG. 2 illustrates example arc rules implemented in each of the network devices for creating a loop-free routing topology comprising routing arcs and buttressing arcs, according to an example embodiment.

FIG. 5 illustrates an example sequence of routing arcs and buttressing arcs created by the network devices of FIG. 1 during creation of a loop-free routing topology, according to an example embodiment.

DESCRIPTION OF EXAMPLE EMBODIMENTS

Overview

Figure 1:
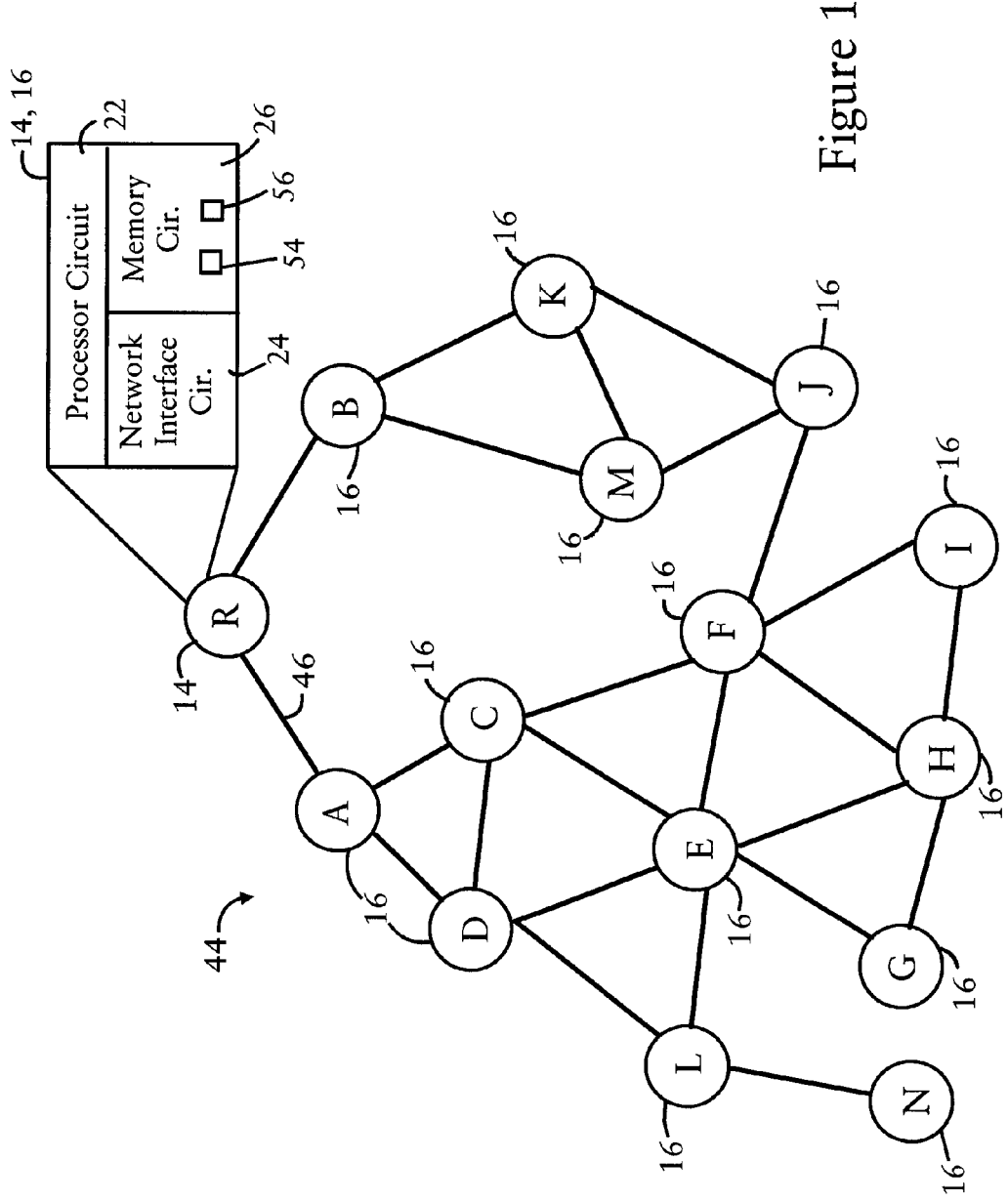
FIG. 1 illustrates an example computing network comprising a plurality of network devices coupled by data links, each network device configured for creating a loop-free routing topology for reaching a destination network device, according to an example embodiment.

In one embodiment, a method comprises creating, in a computing network, a loop-free routing topology comprising a plurality of routing arcs for reaching a destination device, each routing arc routing any network traffic along the routing arc toward the destination device via any one of first or second ends of the corresponding routing arc, the creating including forming a buttressing arc having an originating end joined to a first of the routing arcs and a terminating end joined to a second of the routing arcs, the buttressing arc inheriting from the first routing arc a first height to the destination device, the first height of the first routing arc higher than a corresponding second height of the second routing arc; and causing the network traffic to be forwarded, to the destination device, via the buttressing arc and at least one of the first routing arc or the second routing arc.

In another embodiment, an apparatus comprises a network interface circuit and a processor circuit. The network interface circuit is configured for receiving advertisement messages from network devices in a computing network, the advertisement messages advertising respective costs for reaching a destination device. The processor circuit is configured for operating the apparatus as one of the network devices in the computing network. The processor circuit is configured for communicating with the network devices for creating, in the computing network based on the advertisement messages, a loop-free routing topology comprising a plurality of routing arcs for reaching the destination device. Each routing arc routes any network traffic along the routing arc toward the destination device via any one of first or second ends of the corresponding routing arc. The processor circuit also is configured for forming a buttressing arc having an originating end joined to a first of the routing arcs and a terminating end joined to a second of the routing arcs, the buttressing arc inheriting from the first routing arc a first height to the destination device, the first height of the first routing arc higher than a corresponding second height of the second routing arc. The network traffic can be forwarded, to the destination device, via the buttressing arc and at least one of the first routing arc or the second routing arc.

DETAILED DESCRIPTION

Commonly-assigned, copending U.S. application Ser. No. 13/113,113, filed May 23, 2011, entitled "GENERATING A LOOP-FREE ROUTING TOPOLOGY USING ROUTING ARCS", describes a centralized apparatus (e.g., a router, a centralized server, a network management entity, etc.) that can generate routing arcs to create a loop-free routing topology to a destination device. The routing arcs enable instantaneous rerouting of network traffic to a destination device in response to a detected failure of a data link, such that the network traffic can be routed along any of two ends of any routing arc. The routing arcs in the loop-free routing topology guarantee that any network device having at least two data links can reach the destination device via at least one of the routing arcs: the network traffic can be instantaneously rerouted toward another end of a routing arc in response to detected data link failure (or network node failure), based on reversing an identified reversible link within the routing arc. The reversal of the identified reversible link within the routing arc also is guaranteed to not introduce any loops into the loop loop-free routing topology.

According to example embodiments described below, each of the network devices in the network can be configured to exchange advertisement messages, for independent and distributed creation of the loop-free routing topology having routing arcs. Each of the network devices are configured for independently implementing arc rules in order to create the routing topology that includes the routing arcs. Example arc rules include forming different types of arcs, including a root arc, a collapsed arc, and a buttressing arc. Example arc rules also include merging a buttressing arc into another arc to form a multipath routing arc having three or more exit paths toward the destination device.

Hence, network devices can independently create a loop-free routing topology comprising a plurality of routing arcs in an ad hoc manner, based on exchanging advertisement messages, forming routing arcs and buttressing arcs, and merging a buttressing arc into a routing arc to form a multipath routing arc. Additional buttressing arcs can be joined and merged into the multipath routing arc.

A junction node is defined as a network node (i.e., a network device identified based on its relative position within a network topology) that has at least two data links providing respective non-congruent paths for reaching the destination device: the term "non-congruent" in this specification requires that the paths from a junction node do not share any common data link for reaching the destination device, rather each link belonging to one path (from the junction node to the destination device) is distinct and independent of any link belonging to the second non-congruent path (from the junction node to the destination device).

A data link of a junction node also can be deemed a "reversible link" if the data link enables an endpoint of the data link (i.e., network node that is directly coupled to the junction node via the data link) to become a junction node having its own non-congruent paths for reaching the destination device.

In one embodiment, one or more junction nodes coupled by a reversible link can be logically connected in sequence to create a routing arc as a first infrastructure arc having its two corresponding ends terminating at the destination device: this first infrastructure arc also is referred to herein as a "root arc" or "base arc". Additional routing arcs can be created that have at least one end terminating in a previously-created infrastructure arc (e.g., the first infrastructure arc), and the other end terminating in either a previously-created infrastructure arc or the destination device, where each new routing arc includes network devices that are distinct from any of the network devices in previously-generated routing arcs. In other words, a network device assigned to one existing routing arc cannot later be assigned to another routing arc (except if the network device is a junction between the existing routing arc and an end of the newer routing arc, or unless a buttressing arc is merged into an existing arc, described below).

In another embodiment, a routing arc can be created as an infrastructure arc based on identifying, by network devices within a first directed acyclic graph for reaching the destination device, one or more junction nodes having reversible links for reaching the destination device via non-congruent paths; a second routing arc can be created based on identifying, within the first directed acyclic graph, a second directed acyclic graph for reaching one of the junction nodes (as one end of the second routing arc) of the first directed acyclic graph, and identifying within the second directed acyclic graph a new junction node having a new non-congruent path for reaching the destination device that is distinct from the one junction node, the new junction node providing the new non-congruent path via the second end of the second routing arc that terminates either at the destination device or a previously-created infrastructure routing arc.

In another embodiment, a network device can respond to detecting junction nodes of two routing arcs advertising distinct heights to a destination device (i.e., distances from the destination or costs for reaching the destination) by creating a buttressing arc between the two routing arcs and inherit the height of the higher (i.e., further cost) routing arc; the network device also can communicate with the junction node in the higher-cost arc (having the same height as the buttressing arc), enabling merging of the buttressing arc into the first arc to form a multipath routing arc having at least three ends for routing network traffic toward the destination. In other words, the multipath routing arc, having for example the shape of a "comb" structure comprising a backbone and multiple exit paths, can output network traffic via any of the at least three ends of the multipath routing arc. Additional buttressing arcs can be merged to the multipath routing arc, enabling the ad hoc addition of intermediate junction nodes to the multipath routing arc.

Hence, example embodiments enable any network device having two data links in the loop-free routing topology to be guaranteed reachability to the destination device, even if any one data link in the loop-free routing topology encounters a failure, based on reversing an identified reversible link.

FIGS. 1, 7A-7I and 8 each illustrate example network devices 14, 16 configured for exchanging advertisement messages 28 (illustrated in FIG. 3) for ad hoc creation of a loop-free routing topology 10 (FIGS. 7I and 8) toward a destination device 14, according to an example embodiment. The network device 14 illustrates a destination device for the loop-free routing topology 10, also referred to as the "root" (R), and each network device 16 illustrates another network device that creates and uses the loop-free routing topology 10 to forward network traffic (e.g., data packets) to the destination device 14.

Each network device (i.e., apparatus, machine) 14, 16, can be implemented as a wired or wireless computing device such as a mobile router, etc., that executes the disclosed operations for creating the loop-free routing topology 10, based on outputting advertisement messages 28 specifying relevant routing arc parameters to adjacent network devices 16. Each apparatus 14, 16 is a physical machine (i.e., a hardware device) configured for implementing network communications with the other physical machines via data links establishing a link layer mesh topology network 44 (FIG. 1).

As illustrated in FIG. 1, each network device 14, 16 includes a processor circuit 22, a network interface circuit 24, and a memory circuit 26. The processor circuit 22 of each network device 14 or 16 is configured for creating, for a computing network, the loop-free routing topology 10 comprising the routing arcs 12 for reaching the destination device 14, based on exchanging advertisement messages 28 with other network devices 16. The memory circuit 26 can be configured for storing parameters associated with the routing arcs 12 in a state table 54 and/or a topology table 56, described in further detail below. The device interface circuit 24 is configured for outputting advertisement messages 28, described in further detail below with respect to FIG. 3, enabling other network devices 16 to cooperate in formation of the loop-free routing topology 10.

Figure 8:
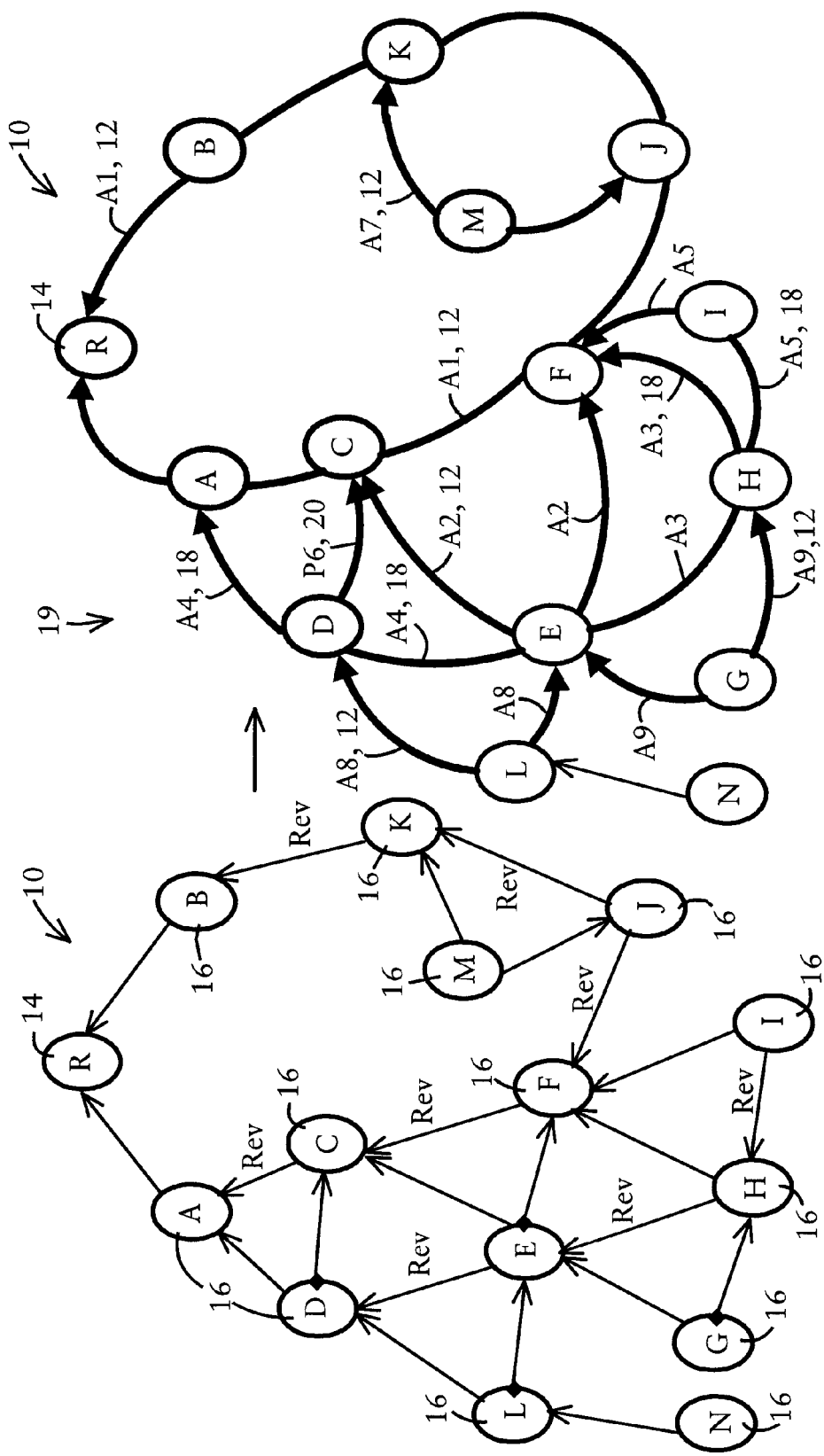
FIG. 8 illustrates the loop-free routing topology including routing arcs and a multipath routing arc for reaching a destination, according to an example embodiment.

FIG. 8 illustrates an example loop-free routing topology 10 for reaching a destination device 14 and that is formed by the network devices 14, 16 from the link layer mesh topology network 44 of FIG. 1, according to an example embodiment. The loop-free routing topology 10 can comprise a plurality of routing arcs 12, a plurality of buttressing arcs 18, and zero or more reinforcing paths 20. Each routing arc 12 and each buttressing arc 18 comprises a plurality of network devices 16 each having at least two data links for reaching adjacent network nodes. The left-hand side of FIG. 8 illustrates reversible links ("Rev") that form the routing arcs 12 and multipath routing arc 19 in the loop-free routing topology, whereas the right-hand side of FIG. 8 illustrates the routing arcs 12, the buttressing arcs 18 that can form the multipath routing arc 19, and a reinforcing path 20.

As described in further detail below, a junction node (e.g., "E") of a routing arc (e.g., "A2") 12 detecting itself as the originating end of a buttressing arc (e.g., "A3" 18 or "A4" 18) can merge the buttressing arc into the routing arc (e.g., "A2") 12 to form a multipath routing arc (e.g., containing junction nodes D, E, H and exit nodes A, C, and F) 19. Similarly, a second buttressing arc (e.g., "A5") 18 can be merged into a multipath routing arc 19, enabling the addition of another junction node (e.g., "I") to the multipath routing arc 19, resulting in the multipath routing arc 19 containing junction nodes D, E, H, I and exit nodes A, C, and F.

As described below, the successive merging of buttressing arcs 18 enables movement of an arc cursor among the junction nodes (e.g., D, E, H, and I) of the multipath routing arc 19, the arc cursor providing exclusive control of directing the network traffic along the multipath routing arc away from any network device having possession of the arc cursor. A junction network node (e.g., "D" of FIG. 8) of the multipath routing arc 19 also can form a buttressing path "P6" 20 in response to an advertising junction node (e.g., "C") 16 of another routing arc (e.g., "A1") 12 advertising a corresponding height that is less than the height of the multipath routing arc 19.

As apparent from FIG. 8, the loop-free routing topology 10 guarantees that any network device 16 along any point in the loop-free routing topology has at least two non-congruent paths for reaching the destination device 14, guaranteeing reachability to the destination device 14 even if a link failure is encountered in the loop-free routing topology 10. Moreover, the multipath routing arc 19 provides improved stability in the loop-free routing topology 10 based on enabling the junction nodes of the multipath routing arc 19 (e.g., D, E, H, I) to move the arc cursor, as needed, to ensure reliable routing of traffic toward the destination device 14.

The term "node" in the specification and claims refers to a network device (i.e., apparatus, machine, etc.) that has an identifiable position within the routing topology 10. Hence, the destination device 14 also can be referred to as a "destination node", "destination network node" or a "root node", and any network device 16 also can be referred to as a "network node".

As described in further detail below, each routing arc 12 comprises at least three network nodes 16, namely a first network device (e.g., network node "K" of FIG. 8) 16 designated as a first end of the routing arc "A7" 12, a second network device (e.g., network node "J" of FIG. 8) 16 designated as a second end of the routing arc "A7", and at least a third network device (e.g., network node "M" of FIG. 8) 16 identified as a junction node and configured for routing any network traffic along the routing arc toward the destination device 14 via any one of two available non-congruent paths provided by the first or second ends of the routing arc. Hence, network traffic can be forwarded along at least one of the routing arcs 12 to the destination device 14. Similarly, each buttressing arc 18 comprises at least three network nodes 16, namely an originating end (e.g., "E" for buttressing arc "A4" 18), a terminating end (e.g., "A" for arc "A4" 18), and a third network device (e.g., "D" buttressing arc "A4" 18) that creates the buttressing arc in response to detecting the originating end and terminating end advertising distinct heights to the destination device 14, the buttressing arc inheriting the larger advertised height from the originating end.

As illustrated in FIG. 8, the first and second ends of each routing arc 12 each terminate at a "safe network node", for example either the destination device 14, another network node directly coupled to the destination device (e.g., network node "A" or network node "B"), or a junction node of another routing arc. A network node (e.g., "A" of FIG. 8) directly coupled to the destination device "R" 14 is referred to as an "heir network node". Hence, a "safe network node" can be any one of the destination device 14, an heir network node (e.g., "A" or "B" of FIG. 8), or a junction node having two non-congruent paths for reaching the destination device. For example, both ends of the routing arc "A1" 12 terminate at the destination device "R" 14, also referred to as the "root network node" or "root node"; a first end of the routing arc "A2" 12 terminates at the network node "C" 16, and a second end of the routing arc "A2" 12 terminates at the junction node "F" of the routing arc "A1" 12. The buttressing arc "A4" 18 (composed of network devices "E", "D", and "A" 16) includes the safe node "E" as the originating end (i.e., the end of the buttressing arc 18 having the higher height relative to the destination device "R" 14), and the safe node "A" as the terminating end (i.e., the end of the buttressing arc 18 having the lower height relative to the destination device "R" 14).

Each routing arc comprises one and only one arc cursor that provides exclusive control of directing the network traffic along the routing arc. One and only one junction node of the routing arc (i.e., one and only one network device assigned a position within the routing arc as a junction node) has possession of the arc cursor at any given time: the junction node having possession of the arc cursor can control the network traffic along the corresponding routing arc 12 based on possession of the arc cursor. For example, a junction node (e.g., "J" of FIG. 8) having possession of the arc cursor for the routing arc "A1" 12 can direct network traffic away from itself along either of its outwardly-oriented links toward the ends of the routing arc "A1" 12. Hence, a junction node having possession of the arc cursor has exclusive control over routing the network traffic along the corresponding routing arc, based on the junction node routing the network traffic away from itself along one of its outwardly-oriented links.

A second junction node (i.e., another network device a position within the routing arc as a junction node) can gain possession of the arc cursor (e.g., from the first junction node of the routing arc) based on a detected failure in the corresponding routing arc, for continued routing of the network traffic in the corresponding routing arc despite the detected failure. For example, the junction node "F" of the routing arc "A1" 12 can gain possession of the corresponding arc cursor 18 that was previously owned by the junction node "J", based on requesting the cursor from junction node "J" in response to a detected failure in the link "F-C" between network nodes "F" and network node "C", enabling the network node "F" to reverse the link "F-J" toward the node "J" for continued reachability toward the destination device "R" 14. Hence, the second junction node (e.g., "F"), upon gaining possession of the arc cursor that provides exclusive control of directing the network traffic along the routing arc (e.g., "A1") 12, can reverse one of the connected reversible links without creating a loop in the loop-free routing topology 10. Hence, data traffic along a routing arc (e.g., "A1") 12 can be instantaneously rerouted for continued routing in the routing arc 12 toward the destination device 14 in response to a detected failure in the routing arc (e.g., failure in link "F-C"), based on a junction node (e.g., "F") in the routing arc gaining possession of the routing arc 18 previously owned by another junction node (e.g., "J") in the same routing arc 12.

Any of the disclosed circuits of the apparatus 14 or 16 (including the processor circuit 22, the device interface circuit 24, the memory circuit 26, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 26) causes the integrated circuit(s) implementing the processor circuit 22 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 26 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22.

The following definitions are provided prior to a description of the methods for creating the routing arcs.

A routing arc is defined as a double ended reversible path. A reversible arc is defined as a routing arc containing one or more reversible links, and the reversible arc can contain one or more non-reversible links at each end of the arc. Data links that are labeled "Rev" in the Figures are reversible links, and links that are not labeled "Rev" in the Figures are not reversible; hence, the end of a routing arc can be identified based on one or more successive non-reversible links, with one or more reversible links internal to the non-reversible links.

A collapsed arc (e.g., "A7" of FIG. 8) is defined as a routing arc 12 having no reversible link and consisting of one network node that has fixed (i.e., non-transferable) possession of the arc cursor, and two other network nodes 16 nodes serving as respective ends of the collapsed arc. For example, the collapsed arc "A7" 12 is illustrated as consisting of the network nodes "J", "M", and "K", where the network node "M" has fixed possession of the arc cursor between the network nodes "J" and "K" at the respective ends of the collapsed arc "A7" 12.

Figure 7A:
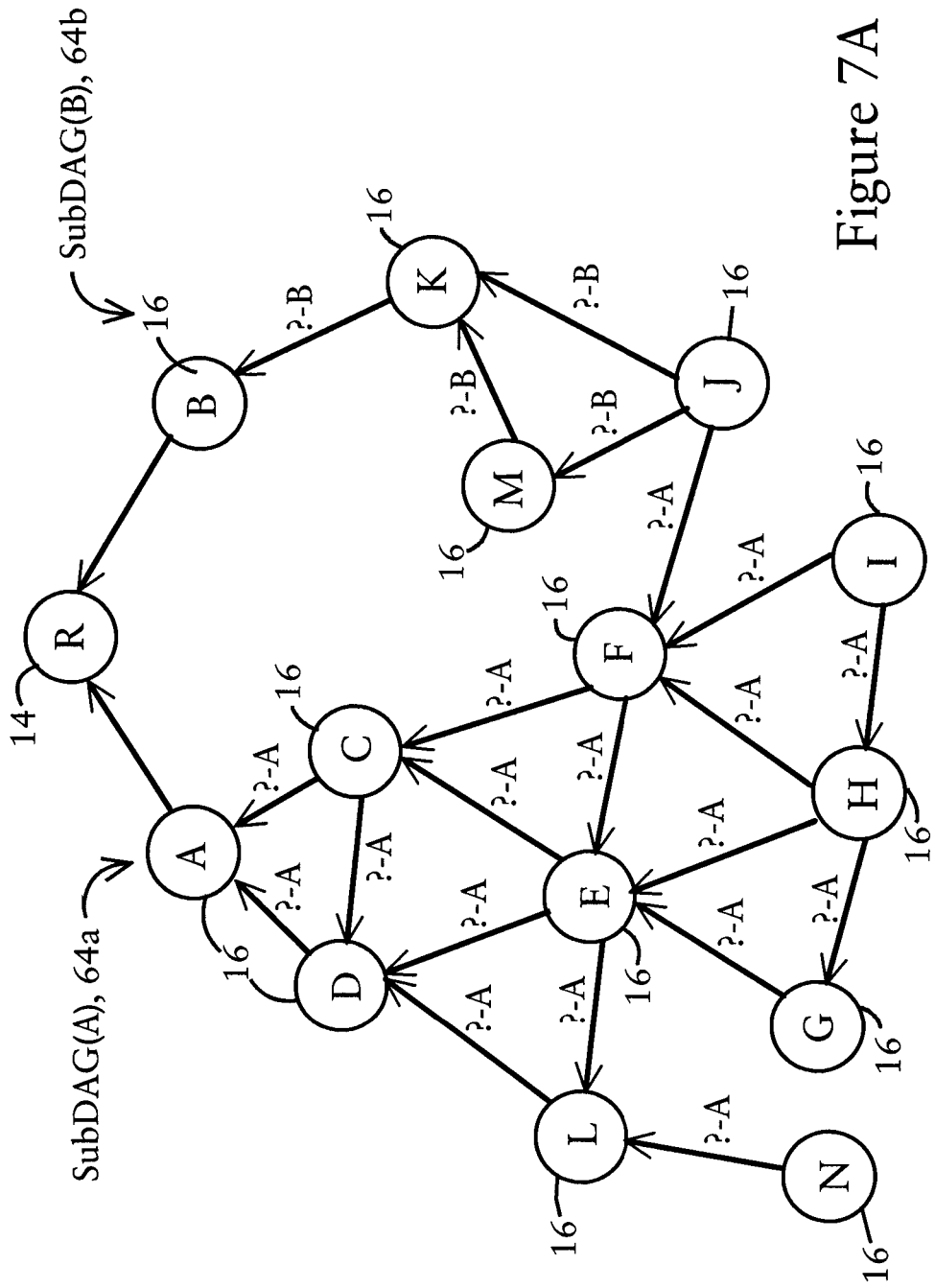
FIGS. 7A-7I illustrate an example sequence of generating the loop-free routing topology by the network devices of FIG. 1, according to an example embodiment.

In this disclosure, links can be identified by the connecting network nodes, such that the link "A-R" refers to a wired or wireless link that connects the network node "A" to the next hop network node "R": an arrow in a link designation can refer to an assigned direction (e.g., "A→R" and "R←A" equivalently identify a link directing traffic from node A to node R), whereas the absence of an arrow in a link designation (e.g., "A-R") indicates that a direction has not yet been assigned to the link. As illustrated in FIG. 7A, a link designated with an arrow at one end represents a link as found in a directed acyclic graph (DAG) generated according to a prescribed DAG routing protocol (e.g., RFC 6550, "RPL: IPv6 Routing Protocol for Low power and Lossy Networks"; Bellman Ford algorithm, or U.S. Pat. No. 7,656,857). Hence, the network node at the end of the arrow represents a feasible successor of the network node at the tail end of the arrow (e.g., network node "A" in FIG. 7A is the feasible successor to network nodes "C" and "D"). Any link at the edge of the arc (i.e., that terminates the arc and connects the arc either to a second arc or to the destination) will be designated using the arrow at one end.

As described previously, the network device having possession of the arc cursor can decide in which direction along the arc network traffic should be forwarded. Hence, a network node is determined to be a "safe network node" if the "safe network node" can forward network traffic in either direction along the arc (i.e., the "safe network node" can safely forward any packet in one direction along the arc even if the other direction fails).

A link designated with the reference "?-S" identifies a subDAG (i.e., a DAG within a DAG) for reaching the safe node "S". In other words, the reference "?-A" represents a path for reaching a safe node "A", whereas the reference "?-B" represents a path for reaching the safe node "B". As illustrated in FIG. 7A, the network nodes can multicast safe node advertisement messages 28 (illustrated in FIG. 3) to independently identify paths for reaching safe nodes "A" and "B".

A link designated with the reference "Rev" indicates a reversible link connecting two network devices (i.e., network nodes) that are within a routing arc 12; for example, as illustrated on the left side of FIG. 8, a network node (e.g., "J") having at least one reversible link is within the middle of the arc, and can have possession of the arc cursor for the corresponding routing arc. Data links at the edge of a routing arc (e.g., that terminates at a first arc and enters into a second arc, or that terminates at the destination node R) are directed away from the middle of the routing arc (and the junction node having possession of the corresponding arc cursor) 12, and the data links at the edge of a routing arc 12 are not reversible.

A link designated with a square-shaped or diamond-shaped block at one end (e.g., "E[ ]→F" in FIG. 8) indicates a blocked link that is not reversible, where the destination network node (e.g., network node "F" in FIG. 8) cannot send any data traffic to the other sourcing network node (e.g., "E" of FIG. 8), but the sourcing network node (e.g., "E" of FIG. 8) can send data traffic to the destination network node ("E") via the link ("M[ ]→J"). Blocked links are used to prevent any formation of loops.

As described in further detail below, data links are oriented away from the junction node having possession of the arc cursor toward the edges of the routing arc 12, and link orientation of a reversible link can be changed by moving the arc cursor (i.e., passing ownership of the cursor from one network node to another network node).

Routing arcs 12 are built between network nodes identified as junction nodes. A junction node is a network node connected to two or more safe network nodes over non-congruent paths (i.e., no single point of failure can stop reachability from the junction node to the root node). An edge junction is defined as a junction node terminating one and only one reversible link, where the edge junction can have multiple nonreversible links oriented both inwards and/or outwards. An intermediate junction is defined as a junction node 68 that terminates two and only two reversible links, where all other links coupled to the intermediate junction are oriented inwards to avoid loops: a link can be safely reversed towards an intermediate junction. Hence, an intermediate junction consists of two reversible links and zero or more inward oriented links from any other network node. A collapsed arc does not have any intermediate junction, and an edge junction can belong to one or more collapsed arcs.

A root network node 14 is defined as a single network node in a network topology 10 (i.e., a "destination device") that must be accessed to reach a resource, i.e., there never can be a second path that can bypass the root network node to reach the resource. Hence, each of the routing arcs 12 are built for routing network traffic to a root node (i.e., the destination node) 14 for a given routing topology 10. Examples of a root node 14 can include a head end of an autonomous directed acyclic graph within the routing arcs 12, a gateway to another network, or any identifiable destination. All of the root links always are oriented inwards toward the root node 14 and resolved.

An "heir" network node is a network node that is directly connected to a root network node 14. As illustrated in FIG. 8, a destination device serving as a root network node 14 must have at least two heir network nodes (e.g. network nodes "A" and "B" of FIGS. 6A-6I) that are directly connected to a root network node 14: if a root network node has only one heir node, then the heir network node is designated as the new root node (based on the definition of a root network node as having no second path to reach a resource). The heir network node is used to identify a safe network node: if a network node can reach the root node alternatively via either a first heir network node or a second heir network node, then the network node is considered a safe network node because it can route a packet to the root via two non-congruent paths, namely either via the first heir network node or via the second heir network node, guaranteeing that reachability if one of the links toward the root node is broken.

A leaf network node is a node that has one and only one data link: a leaf node (e.g., "N" of FIG. 8) cannot be a junction node and cannot belong to a routing arc 12. The data link coupled to the leaf network node is always oriented outwards (i.e., away from the leaf network node) and resolved.

A safe network node is a designation used to identify any one of a root network node 14, an heir node (e.g., "A" or "B" of FIG. 8), or a junction node. Hence, a junction node is a network node that is neither a root network node 14 nor an heir network node, but that is a safe network node because it has two or more non-congruent paths to the root network node such that no single point of failure can cut off the junction node from the root network node. A network node can be identified as a junction node if the direction of a reversible link must be turned to obtain the alternate path.

Hence, a network node connected to an heir network node and the root network node is a junction node; a network node connected to two different heir network nodes is a junction node; a network node connected to an heir network node and a junction node also is a junction node; a network node connected to two different junction nodes also is a junction node. Since the root network node, the heir network node, and the junction node each are defined as safe network nodes, then a network node connected to two different safe network nodes is a junction node; a network node that has non-congruent paths to at least two different safe network nodes is a junction node (the junction node can be considered to "see" to safe network nodes, and then hide them so long as they are only reachable from via that junction node); a network node that can only see one junction node is within the "subDAG" that junction node and can be tracked as such.

Hence, a data packet must follow along a routing arc 12 (or buttressing arc 18, or multipath arc 19), and can exit only via an edge junction at one of the ends of the routing arc 12 (or buttressing arc 18, or multipath arc 19). Consequently, a data packet can reach the root node (i.e., the destination node) 14 based on traveling along one or more routing arcs 12 (or buttressing arc 18, or multipath arc 19).

FIG. 2 illustrates example rules 30 that are implemented by the processor circuit 22 of each of the network devices 14, 16, for distributed creation of the loop-free routing topology 10 by the network devices 14, 16, according to an example embodiment. As illustrated in FIG. 2, Rule Number 1 specifies that any new arc (e.g., A2 of FIG. 8) 12 or 18 must terminate in an existing arc (e.g., A1), or alternately must terminate in the final destination device 14. Rule Number 2 specifies that, except for junction nodes, any new arc 12 or 18 also must include nodes that are not already in an existing arc. Rule Number 3 specifies that during formation of a new arc (e.g., A2) 12 or 18 relative to existing arc (e.g., A1) 12, the height of the new arc (e.g. A2) must be strictly greater than the height of the existing arc (A1) into which the new arc terminates. For example, in FIG. 8, the buttressing arc "A3" 18 has a terminating end "F" of the root arc "A1" 12 having the height "H1=1", and the buttressing arc "A3" also originates from the network node "E" of routing arc "A2" having a height of "H2=2" (i.e., the buttressing arc "A3" has the originating end "E").

Rule Number 4 of FIG. 2 specifies that a new buttressing arc (e.g., "A3" formed by network nodes E-H-F) 18 can be formed based on attaching the originating end (i.e., the higher end) (e.g., "E") of the buttressing our 18 to a second existing arc (e.g., A2) 12 if the lower end (e.g., "C") of the second existing arc (A2) terminates in a third arc (e.g., A1) having a height (H1) that is strictly below the height (H2) of the second existing arc (A2) (i.e., H1<H2). Rule Number 5 of FIG. 2 specifies that the height of any comb structure 19 (i.e., multipath routing arc) is applied to the height of the last added arc; in other words, a buttressing arc 18 that is added to an existing routing or 12 or an existing multipath routing arc 19 inherits the height of the existing routing arc 12 or the existing multipath routing arc 19.

Implementation of the example rules 30 are illustrated by the following description.

Figure 3:
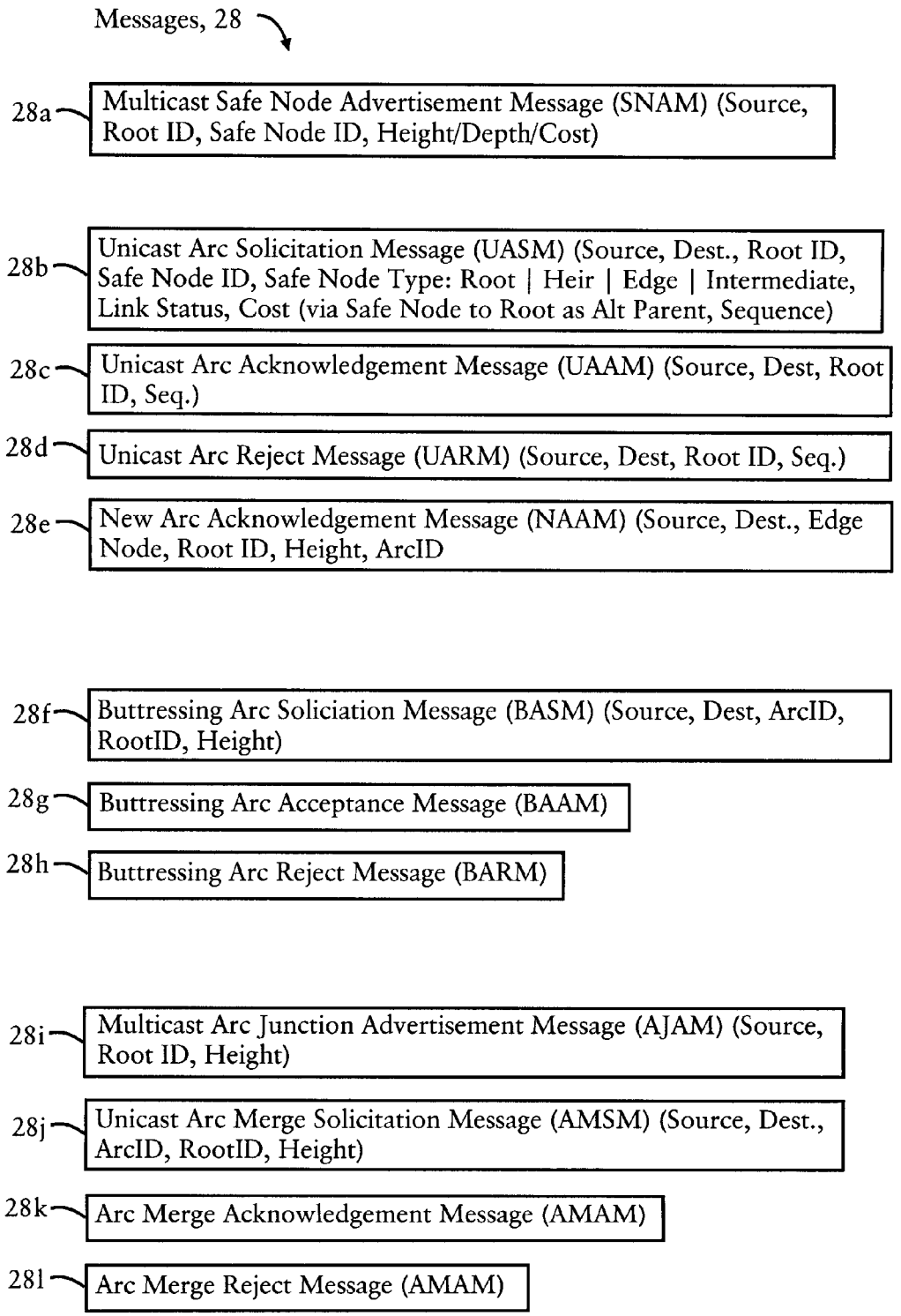
FIG. 3 illustrates example advertisement messages generated by the network devices of FIG. 1 for formation of a loop-free routing topology comprising routing arcs and buttressing arcs, according to an example embodiment.

FIG. 3 is a diagram illustrating example advertisement messages that can be generated by the processor circuit 22 and sent or received by the network interface circuit 24 of any of the network devices 14 or 16, according to an example embodiment. As described in further detail below, the advertisement message 28a can be multicast by the network devices 14 or 16 during formation of the directed acyclic graphs 64 of FIG. 7A; the advertisement messages 28b through 28e can be generated and sent during formation of the root arc "A1" of FIGS. 7B and 8, or any collapsed arcs (e.g., A2, A7, A8, or A9); the advertisement messages 28f through 28h can be generated and sent during formation of buttressing arcs (e.g., A3, A4, A5) 18; and the advertisement messages 28i through 28l by junctions having formed an arc for arc advertisement, and 4 merging a buttressing arc 18 into an existing arc. The advertisement messages will be described in further detail below.

Figure 4A:
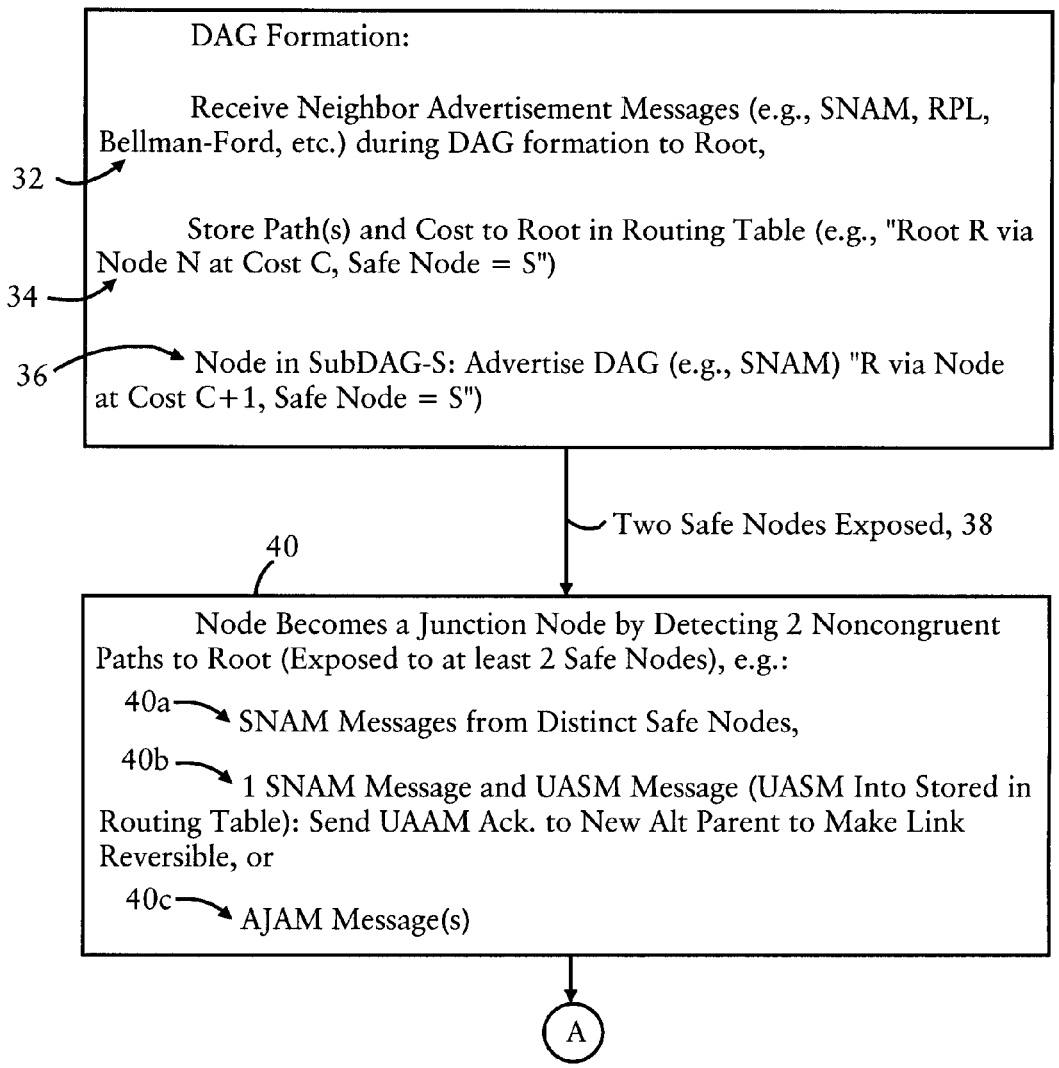
FIGS. 4A, 4B, and 4C summarize an example state diagram executed by the network devices of FIG. 1 for implementation of the arc rules of FIG. 2 in creating the loop-free routing topology, according to an example embodiment.
Figure 4B:
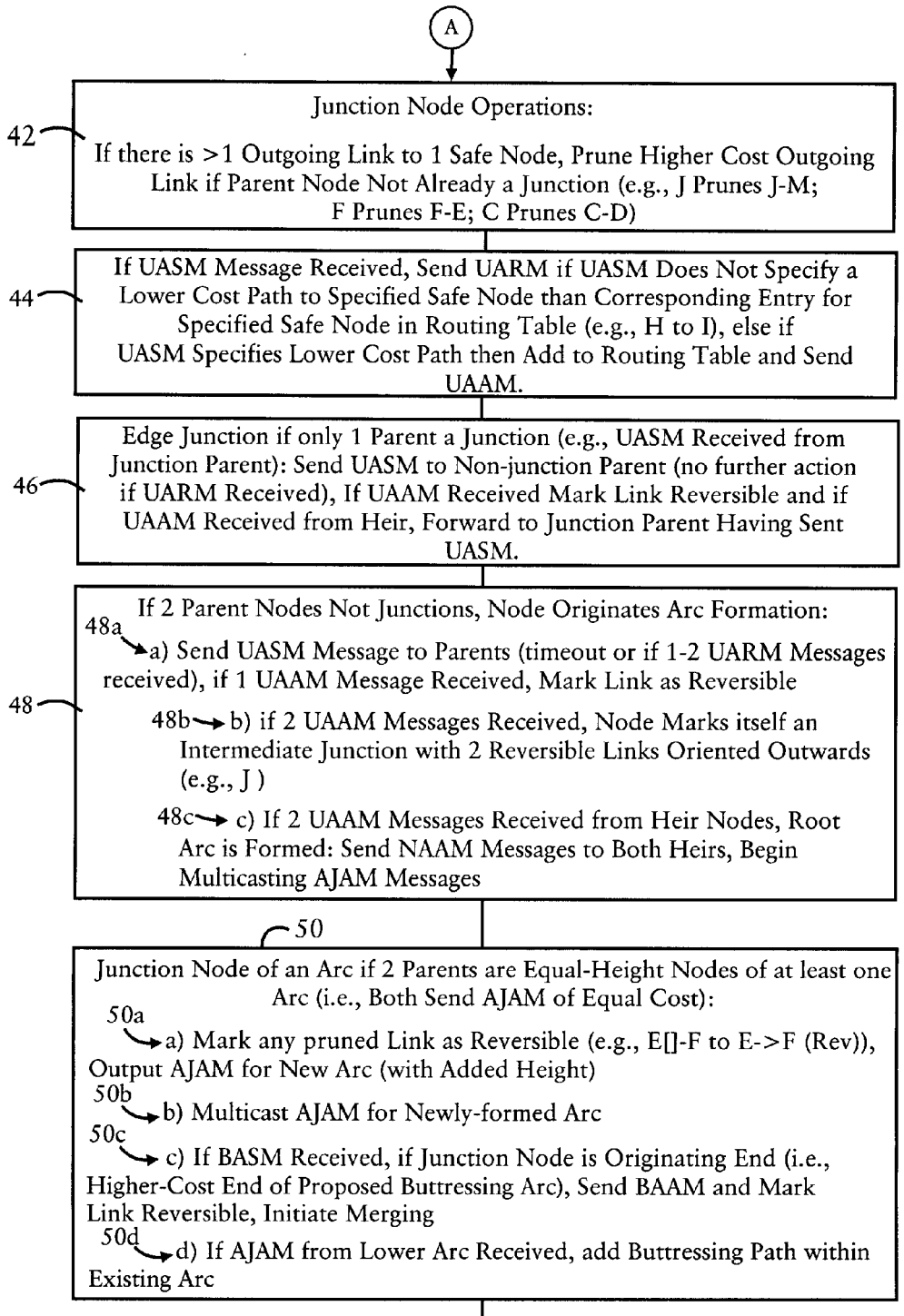
Figure 4C:
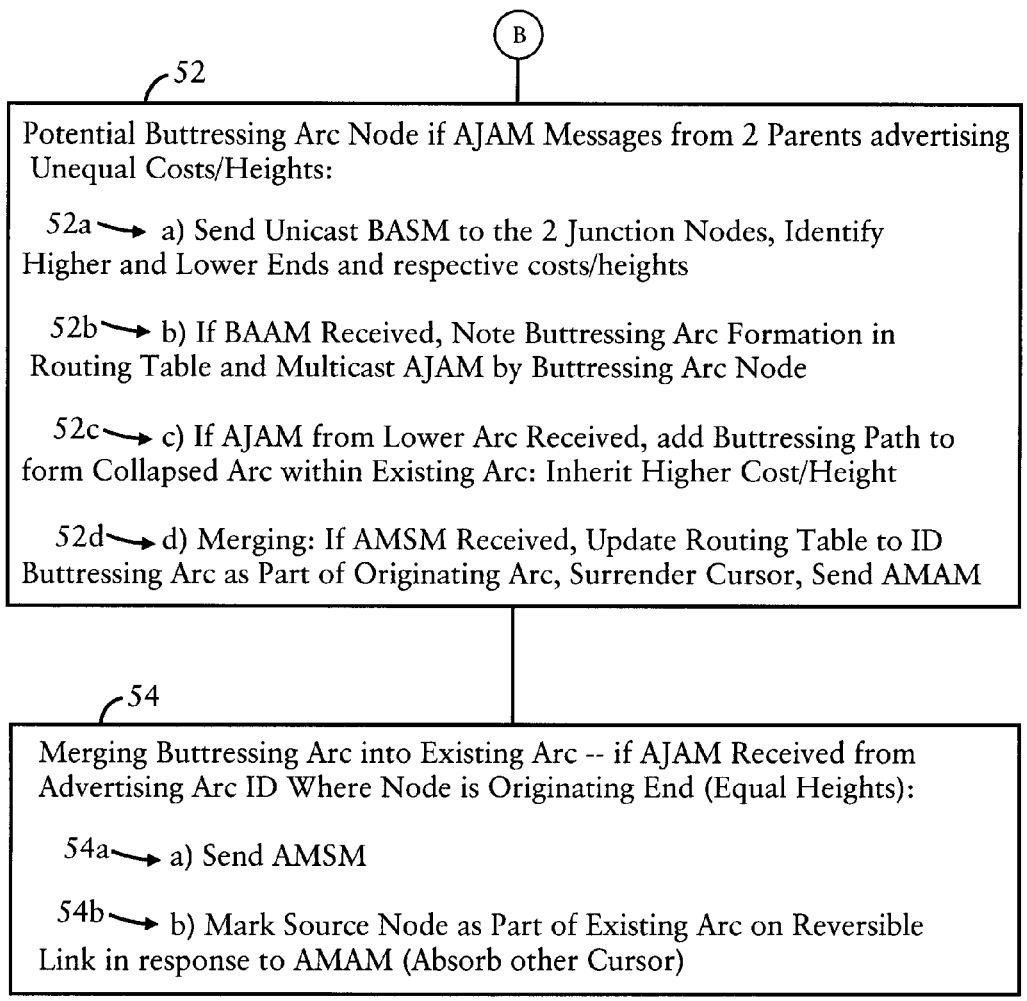
Figure 6A:
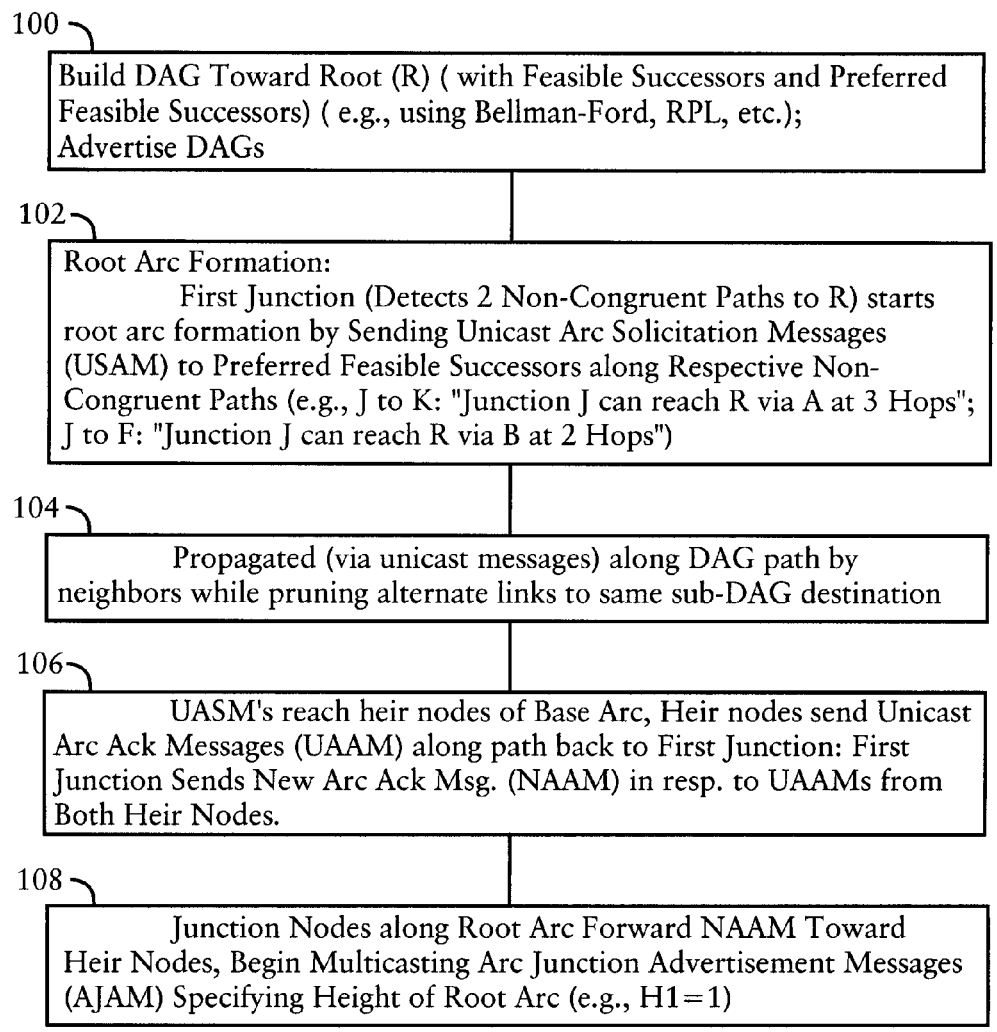
FIGS. 6A-6B illustrate an example method of generating the loop-free routing topology comprising routing arcs, including merging of a buttressing arc into a routing arc to form a multipath routing arc, according to an example embodiment.
Figure 6B:
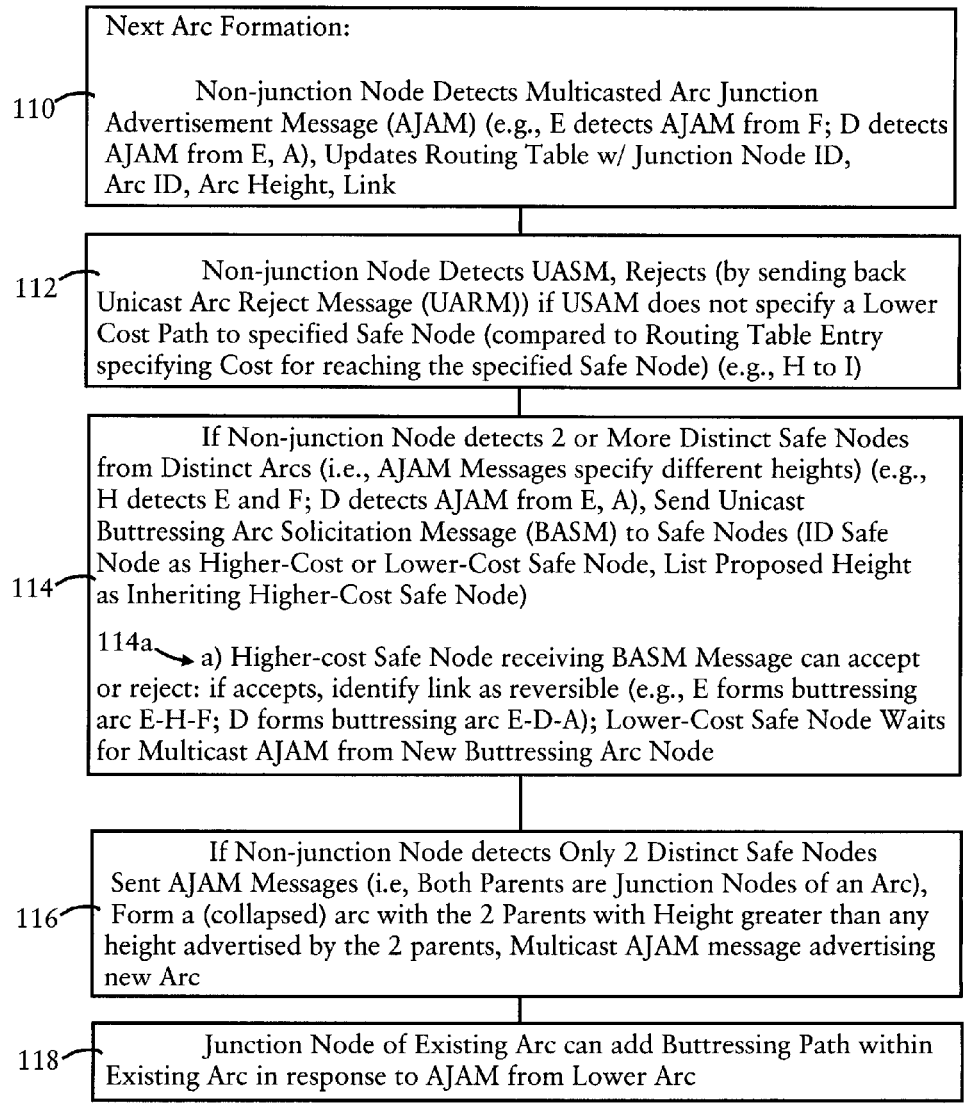

FIGS. 4A, 4B, and 4C summarize an example state diagram executed by the network devices 14, 16 of FIG. 1 for implementation of the arc rules of FIG. 2 in creating the loop-free routing topology, according to an example embodiment. FIGS. 6A-6B illustrate an example method of generating the loop-free routing topology comprising routing arcs, including merging of a buttressing arc into a routing arc to form a multipath routing arc, according to an example embodiment.

The steps described in FIGS. 4A-4C, and 6A-6B (and illustrated in FIGS. 5, 7A-7I and 8) can be implemented as executable code stored on a computer or machine readable non-transitory tangible storage medium (e.g., floppy disk, hard disk, ROM, EPROM, EEPROM, nonvolatile RAM, CD-ROM, etc.) that are completed based on execution of the code by a processor circuit implemented using one or more integrated circuits; the steps described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 4A, the processor circuit 22 in each network device 14, 16 can initiate creation of the loop-free routing topology 10 in step 32 (step 100 of FIG. 6A) in response to receiving a neighbor advertisement message initiated by the destination device 14. For example, the processor circuit 22 of the destination node 14 can generate a multicast safe node advertisement message (SNAM) 28a that is multicast by the network interface circuit 24 to adjacent network nodes 16 (e.g., A and B). As illustrated in FIG. 3, the safe node advertisement message 28a can specify the source of the message 28a, the root identifier that identifies the destination network node (e.g., "R"14), and identifier for the nearest safe node, and the height (i.e., depth or cost) relative to the root 14: in the case of the root network device 14 initiating formation of the directed acyclic graph, the safe node advertisement message can either specify the same identifier (e.g., IP Address, MAC address, alphanumeric identifier "R", etc.) for the source identifier, root identifier, and safe node identifier; alternately, the safe node advertisement message 28a transmitted by the root node 14 could be truncated to include only the source identifier, assuming all network nodes can interpret this to mean that the truncated messages generated by the root 14. Alternate advertisement messages for generating the directed acyclic graph of FIG. 7A can be used, for example as described by RFC 6550, Bellman-Ford, U.S. Pat. No. 7,656, 857, etc. The following description will use the alphanumeric identifiers of the network devices 14, 16 to simplify the description.

In response to the adjacent network nodes A and B 16 receiving in step 32 the multicast safe node advertisement message 28a from the root node 14, the processor circuits 22 in each of the nodes A and B can identify themselves as safe nodes, and store in their respective state table 54 and/or topology table 56 the information from the safe node advertisement message 28a, specifying that the destination to the root node "R" is reachable via the link A→R (for node A) or the link B→R (for node B) at a cost of 1 hop in step 34. The processor circuit 22 of the safe nodes A and B in step 36 can generate their own safe node advertisement messages 28a for multicasting to adjacent network nodes. For example, the network node A 16 can multicast in step 36 the safe node advertisement message 28a specifying that the root node "R" is reachable via the node "A" at a cost of 1 hop, and that the nearest safe node is "A"; similarly, the network node B 16 can multicast in step 36 the safe node advertisement message 28a specifying that the root node "R" is reachable via the node "B" at a cost of 1 hop, and that the nearest safe node is "B".

In the case of creating the subDAG(A) 64a of FIG. 7A, the safe node advertisement message 28a advertised by the safe network node "A" is detected by the network nodes D and C in step 32, which in response store in their respective state table 54 and/or topology table 56 (referred to collectively herein as "routing table") in step 34 that the root node "R" is reachable via the node A at a cost of 2 hops, the nearest safe node being "A". The processor circuit 22 in each of the nodes D and C can generate their own safe node advertisement messages 28a in step 36, each specifying that the root node "R" is reachable via the corresponding node "D" or "C" at a cost of 2 hops, the nearest safe node being "A". The network nodes "L" and "E" can detect in step 32 the safe node advertisement message 28a advertised by the node "D", and the network nodes "E" and "F" can detect in step 32 the safe node advertisement message 28a advertised by the network node "C".

In response to the network node "E" detecting in step 32 the safe node advertisement messages 28a from the nodes D and C in step 32, the network node E in step 34 can store in its routing table (e.g., tables 54 and/or 56) that the root "R" is reachable via nodes D and/or C at a cost of 3 hops each, the nearest safe node being "A" for both nodes D and C (similar operations can be performed by the processor circuits 22 of the network nodes L and F in response to the received safe node advertisement messages). Hence, the network node E can advertise in step 36 a safe node advertisement message specifying that the root node "R" is reachable via the node "E" at a cost of 3 hops, the nearest safe node being node "A": note that since the node E has only been exposed to the safe node "A", the network node "E" does not yet have two non-congruent paths for reaching the destination node "R", since both paths must pass through the same safe node "A".

The safe node advertisement message 28a advertised by the network node "E" can be detected by the adjacent network nodes "L", "F", "G", and "H" in step 32. Each of these network nodes can update their routing tables accordingly in step 34, and multicast in step 36 updated safe node advertisement messages 28a that have an updated source identifier and cost as described above. As apparent from the foregoing, the propagation of the multicast safe node advertisement messages 28a originating from the safe node "A" results in the subDAG(A) 64a of FIG. 7A; in a similar manner, the propagation of safe node advertisement messages 28a originating from the safe node "B" results in the subDAG(B) 64b of FIG. 7A. Hence, the propagation of safe node advertisement messages 28a originating from the safe nodes A and B establish the formation of the directed acyclic graphs 64 of FIG. 7A, completing the initial step 100 of FIG. 6A.

At event 38 the processor circuit 22 of the network node "J" 16 detects the safe node advertisement message 28a from network node "F" originated from the safe node "A", and the safe node advertisement message 28a from network node "K" originated from the safe node "B", and therefore detects that the network node "J" is exposed to two safe nodes "A" and "B". Hence, the network node "J" detects in step 40 that it has two non-congruent paths for reaching the destination root "R" 14, and in response determines in step 40 that it is a junction node based on the safe node advertisement messages 28 from distinct safe nodes "A" and "B" (event 40a and step 102 of FIG. 6A).

In response to the processor circuit 22 of the network node "J" 16 detecting that it is a junction node having two non-congruent paths to the root based on the safe node advertisement messages 28a from distinct safe nodes in step 40a, the processor circuit 22 proceeds to the state diagram of FIG. 4B. Referring to FIG. 4B, the processor circuit 22 of the network node "J" in step 42 detects that it has more than one outgoing link to the safe node "B", and in response prunes in step 42 (and step 104 of FIG. 6A) the higher cost outgoing link "J→M" (illustrated in FIG. 7A) into a blocked link "M[ ]→J" (illustrated in FIG. 8) to prevent the node "J" from creating a loop by sending any network traffic to node "M". In particular, the processor circuit 22 updates its routing table to specify the link "J-M" is not available for routing any network traffic to the destination root "R" 14, ensuring no loop can be formed between the nodes J, M, and K.

The processor circuit 22 of node J skips steps 44 and 46 of FIG. 4B (described below) as nonrelevant, and initiates formation of the root arc "A1" in step 48a in response to detecting that the two parent nodes "F" and "K" (and alternate parent "M") are not junction nodes. In particular, the processor circuit 22 in step 48a of FIG. 4B (and step 102 of FIG. 6A) initiates root arc formation by outputting unicast arc solicitation messages (UASM) 28b of FIG. 3. As illustrated in FIG. 3, the unicast arc solicitation message 28b can specify the source (e.g., "J") of the message 28b, the destination (e.g., "F" or "K"), the root identifier (e.g., "R"), the safe node identifier (e.g., "A" or "B"), the safe node type (i.e., whether the safe node is a root node, an heir network node, and edge junction of an arc, or an intermediate junction of an arc) (e.g., "heir"), the connecting link status (e.g., an assigned, reversible, blocked, etc.); height or cost to the root via the specified safe node as an alternate parent, and a sequence identifier. Hence, the unicast arc solicitation message 28b can specify the originator of the message, along with descriptors describing the structure of the arc under formation.

Each unicast arc solicitation message 28b is output to a preferred feasible successor along the respective non-congruent paths. For example, the junction node "J" generates and sends in step 48a of FIG. 4B (102 of FIG. 6A) a unicast arc solicitation message 28b to its preferred feasible successor "K" in the subDAG 64b specifying that the junction "J" can reach the root "R" via the safe node "A" (identified as of type "heir network node") at a cost of 3 hops; the junction node "J" also sends a unicast arc solicitation message 28b to its preferred feasible successor "F" in the subDAG 64a specifying that the junction "J" can reach the root "R" via the safe node "B" (identified as of type "heir network node") at a cost of 2 hops.

As described previously, node "F" had updated its routing table in step 34 of FIG. 4A in response to the safe node advertisement message 28a specifying reachability to the root "R" via the safe node "A", and node "K" had updated its routing table in step 34 specifying reachability to the root "R" via the safe node "B". The network nodes "F" and "K" each become junction nodes in step 40b (FIG. 4A) in response to receiving the unicast arc solicitation messages 28b from the junction node "J": each of the network nodes "F" and "K" can update their routing tables with the information specified in the corresponding unicast arc solicitation message 28b, providing the new junction network nodes "F" and "K" with a second non-congruent path to the root "R" (i.e., "F" adds to its routing table the path to the root "R" via the junction node "J" and safe node "B"; "K" adds to its routing table the path to the root "R" via the junction node "J" and safe node "A").

The junction nodes "F" and "K" each respond in step 40b to the unicast arc solicitation message 28b in steps 44 and 46 of FIG. 4B, namely generating a corresponding unicast arc acknowledgment message 28c sent to the junction "J". The two unicast arc acknowledgment messages 28c from the junction nodes "F" and "K" cause the junction node "J" in step steps 46 and 48b of FIG. 4B to mark within its routing table the respective links as reversible links (e.g., "J→F (Rev)" and "J→K (Rev)" in FIG. 8), and cause the junction node "J" to identify itself in its routing table (and advertisement messages) as an intermediate junction node with the two reversible links "J→F (Rev)" and "J→K (Rev)" oriented outward. The junction node "F", in response to becoming a junction node in step 40b, also prunes in step 42 of FIG. 4B the link "F-E" to "E[ ]→F" (FIG. 8) in its internal routing table to prevent the formation of any loop. The junction nodes "F" and "K" also each respond in step 40b and 46 as edge junctions to generate their own respective unicast arc solicitation messages 28b to their respective feasible successors (i.e., non-junction parents) "C" and "B".

Similar to the foregoing description with respect to the network nodes "F" and "K", the network node "C" had previously updated its routing table in step 34 with a path to the root "R" via the safe node "A", and the heir network node "B" had updated its routing table in step 34 with a path to the root "R" as an heir network node, in response to the received safe node advertisement messages 28a. In response to receiving the respective unicast arc solicitation messages 28b from the junction nodes "F" and "K", the network nodes "C" and "B" become junction nodes in step 40b (FIG. 4A), update their routing tables with the path to the alternate safe node, and prune any higher cost links in step 42 (e.g., node "C" prunes C-D to "D[ ]→C as in FIG. 8). The nodes "B" and "C" become edge junctions in step 46, and both nodes "B" and "C" return a unicast arc acknowledgment message 28c to the nodes "K" and "F", respectively. The nodes "F" and "K" in step 46 mark the respective links as reversible (e.g., "F→C (Rev)", "K→B (Rev)") (FIG. 8) in their respective routing tables, and the node "K" forwards the unicast arc acknowledgment message 28c received from the heir network node "B" to its junction parent "J" having sent the unicast arc solicitation message 28b. The junction node "J" that originated the arc formation in step 48 marks that the receipt of the unicast arc acknowledgment message 28*c* from one of the two safe nodes.

The edge junction "C" in step 46 also sends a unicast arc solicitation message 28*b* to the non-junction parent "A": the heir network node "A" responds in steps 40*b* and 44 by updating its routing table with the alternate path to the root "R", and sending back to the junction node "C" a unicast arc acknowledgment message 28*c*. The junction node "C" responds in step 46 to the unicast arc acknowledgment message 28*c* from the heir network node "A" by marking the link as reversible (e.g., "C→A (Rev)"), and forwarding the unicast arc acknowledgment message 28*c* from the heir network node "A" to the junction node "F"; the junction node "F" forwards the unicast arc acknowledgment message 28*c* from the heir network node "A" to the junction node "J".

Hence, the first junction "J" in step 102 of FIG. 6 starts the root arc formation by sending the unicast arc solicitation messages 28*b* to the preferred feasible successors along the respective non-congruent paths; the unicast arc solicitation messages 28*b* are propagated in step 104 along the path of the directed acyclic graph by the neighbors while pruning alternate links to the same safe node (i.e., sub-DAG destination). Once the unicast arc solicitation messages 28*b* have reached the heir nodes "A" and "B" in step 106, the heir network nodes return unicast arc acknowledgment messages 28*c* along the path back to the first junction "J" that initiated the root arc formation.

Figure 7B:
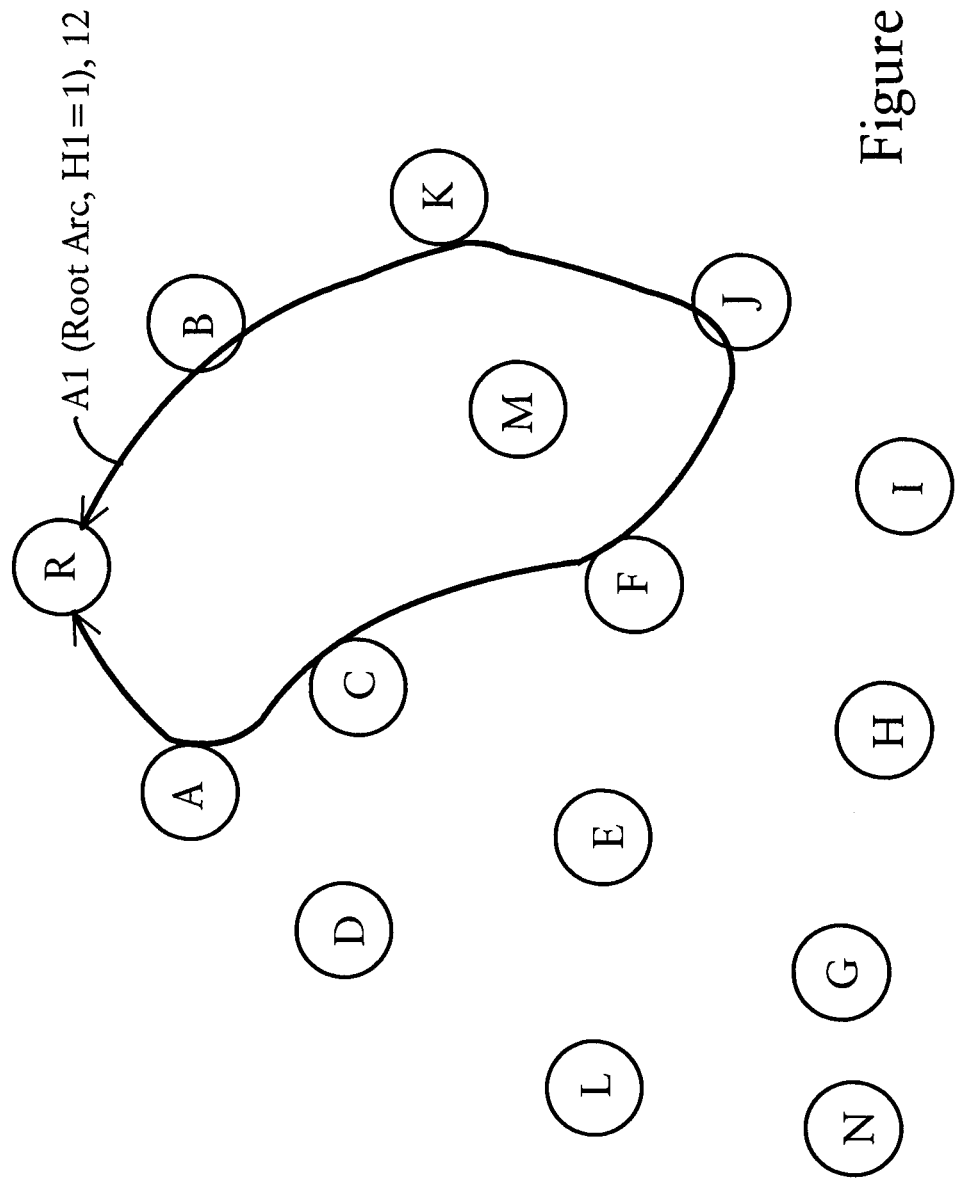
Figure 7C:
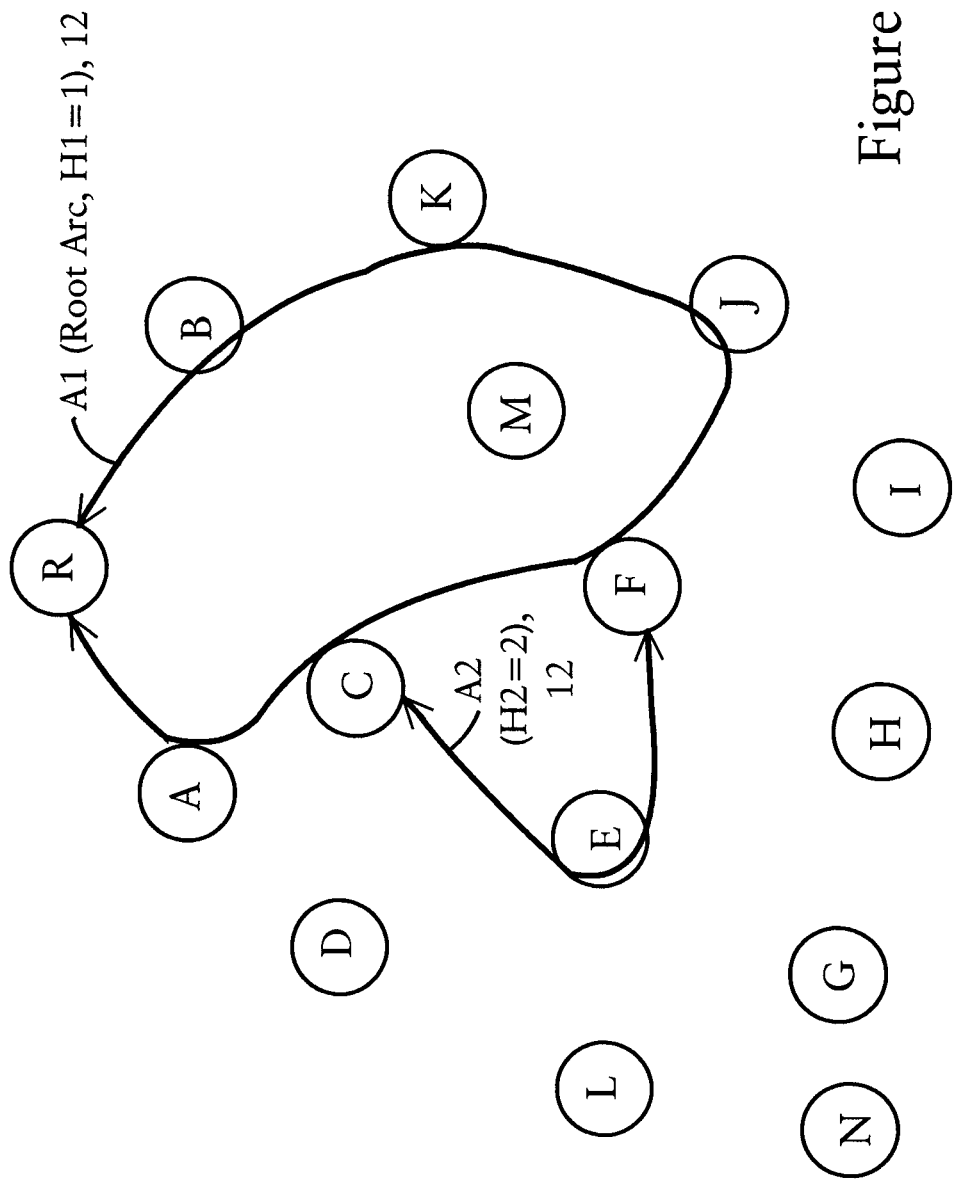

In response to the junction node "J" receiving the unicast arc acknowledgment messages 28*c* from the heir network nodes in step 48*c* (FIG. 4B) and 106 (FIG. 6A), the processor circuit 22 of the junction node "J" sends in steps 48*c* and 106 new arc acknowledgment messages 28*e* to both heir nodes "A" and "B" acknowledging establishment of the root arc "A1" with a height of "H1=1", illustrated in FIG. 7B. As illustrated in FIG. 3, the new arc acknowledgment message 28*e* can specify a source (e.g., "J"), a destination (e.g., one of the heir network nodes "A" or "B"), end edge node identifier (e.g., one of the heir network nodes "A" or "B"), a root identifier (e.g., "R"), a height (e.g., "H1=1"), and an arc identifier (e.g., "A1").

The junction node "J" also begins in step 48*c* multicasting arc junction advertisement messages 28*i* specifying that the root "R" is reachable via the arc "A1" at a prescribed height (e.g., "H1=1"). As illustrated in FIG. 3, the arc junction advertisement message 28*i* can specify the source (e.g., "J"), the arc identifier (e.g., "A1", or alternately "J" as owner of the arc cursor for the arc), the root identifier (e.g., "R"), and the arc height (e.g., "H1=1"). As illustrated in step 108 of FIG. 6A, the junction nodes along the root arc "A1" forward the new arc acknowledgment messages 28*e* from the intermediate junction node owning the arc cursor (node "J") toward the heir network nodes "A" and "B", and in response to receiving the new arc acknowledgment messages 28*e* begin multicasting the arc junction advertisement messages 28*i* specifying the height of the root arc (e.g., "H1=1"), resulting in the completion of the root arc "A1" illustrated in FIGS. 5, 7B, and 8. Each of the junction nodes along the root arc "A1" 12 (e.g., A, C, F, J, K, B) become arc junction nodes, and begin multicasting the arc junction advertisement message 28*i* upon establishment of the root arc "A1" 12.

Referring to FIG. 7B, the network node "E" can identify in event 38 of FIG. 4A that it is a junction node in response to detecting in step 40*c* the multicast arc junction advertisement messages 28*i* from the arc junction nodes (i.e., safe nodes) "C" and "F". Hence, the junction node "E" in step 50 of FIG. 4B and step 110 of FIG. 6B can update its routing table with the reachability to the root "R" via the non-congruent paths "C" and "F", including updating the routing table with the junction node identifier, arc identifier, arc height, and link identifier. Hence, the junction node "E" can form its own collapsed arc "A2". The junction node "E" begins multicasting its own arc junction advertisement message 28*i* in step 50*b*, advertising that the arc "A2" 12 has a depth of "H2=2" as in FIG. 5 and FIG. 7C.

Figure 7D:
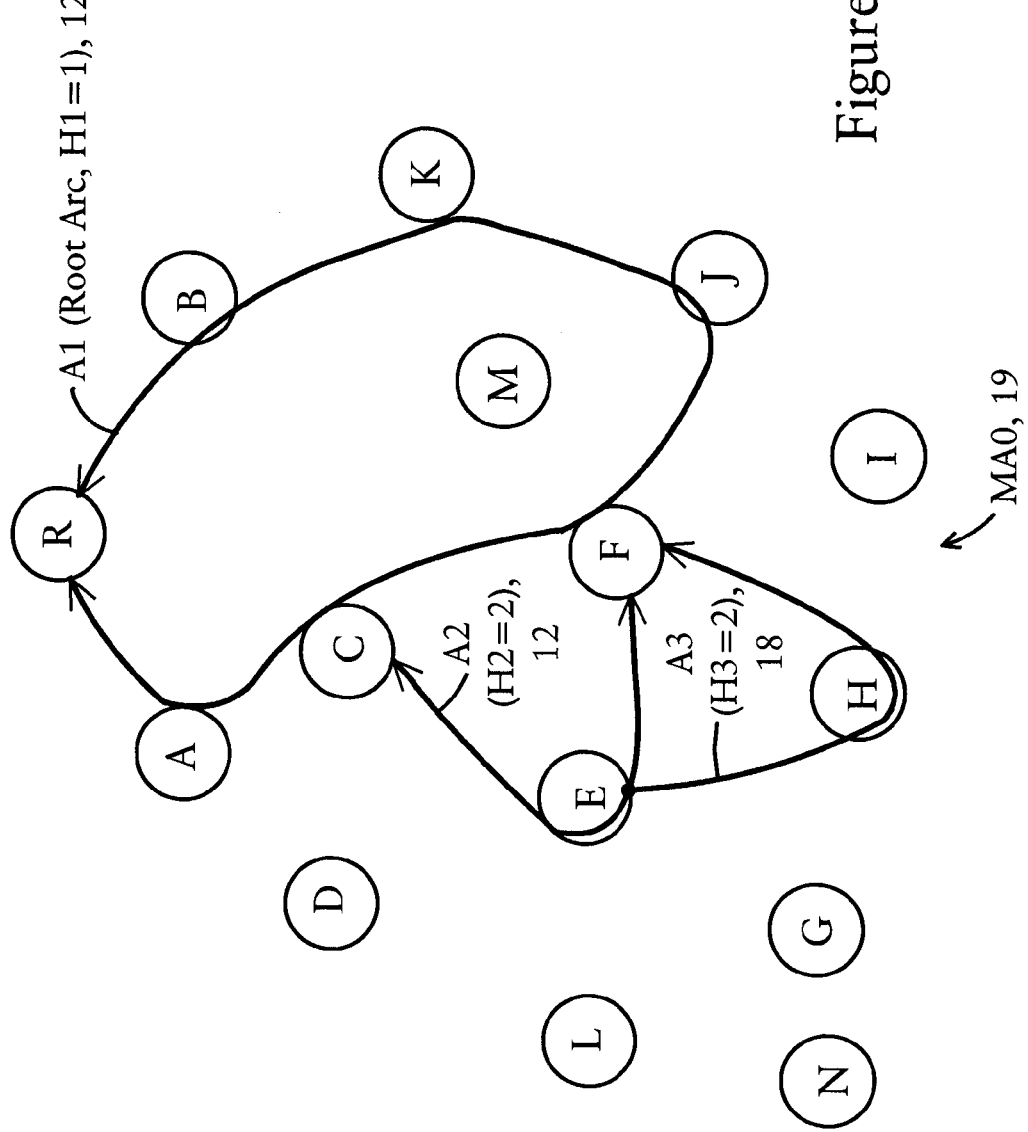

The node "H" can form a buttressing arc "A3" having an originating end joined to the junction node "E" of the routing arc "A2" and a terminating end joined to the junction node "F" of the root arc "A1" 12. Referring to FIG. 7D, the network node "H" can identify in event 38 of FIG. 4A that it is a junction node in response to detecting in step 40*c* of FIG. 4A the multicast arc junction advertisement messages 28*i* from the arc junction nodes (i.e., safe nodes) "E" and "F". The network node "H" can identify in step 52 of FIG. 4C that it can form a buttressing arc based on identifying the arc junction nodes "E" and "F" advertising unequal heights (e.g., "E" advertises "H2=2", and "F" advertises "H1=1"). Hence, the junction node "H" in step 52*a* of FIG. 4C and step 114 of FIG. 6B can update its routing table with the reachability to the root "R" via the unequal height non-congruent paths "E" and "F", including updating the routing table with the junction node identifier, arc identifier, arc height, and link identifier. The junction node "H" also can send in step 52*a* of FIG. 4C and step 114 of FIG. 6B a unicast buttressing arc solicitation message 28*f* to the higher cost safe node "E" (i.e., higher-height safe node) and the lower-cost safe node "F" (i.e., lower-height safe node). As illustrated in FIG. 3, the buttressing arc solicitation message (BASM) 28*f* can specify a source identifier (e.g., "H"), a destination identifier (e.g., "E" or "F"), a root identifier (e.g., "R"), and a proposed height that inherits the height of the highest cost node (i.e., "H3=H2=2").

The network node "E", in response to receiving the buttressing arc solicitation message 28*f* from the junction node "H", detects in step 50*c* of FIGS. 4B and 114*a* of FIG. 6B that is to be the originating end (i.e., the higher cost and) of the proposed buttressing arc A3; hence, the originating end "E" can decide to form the buttressing arc "A3" by responding to the network node "H" with a buttressing arc acceptance message (BAAM) 28*g*, specifying the source ("E"), destination ("H"), arc identifier ("A3"), root identifier ("R"), and height ("H3=2"); the originating and "E" also can identify the connecting link as reversible "H→E (Rev)" in step 114*a*. The junction node "H" responds in step 52*b* of FIG. 4C to the buttressing arc acceptance message 28*g* by updating its routing table to identify the buttressing arc "A3", and initiating multicast of arc junction advertisement messages 28*i* advertising the new buttressing arc "A3" 18 at a height of "H3=2", illustrated in FIGS. 5, 7D, and 8. Note that the terminating end "F" of the buttressing arc "A3" cannot send any packets toward the junction node "H", hence the terminating end "F" need not receive the buttressing arc solicitation message 28*f*, if preferred.

In response to the processor circuit 22 of the network node "E" detecting itself in step 54 of FIG. 4C as the originating end of the buttressing arc (e.g., based on the buttressing arc identifier "H3" and the buttressing arc height equaling the existing arc height), the processor circuit 22 of the network node "E" can send in step 54*a* of FIG. 4C a unicast arc merge solicitation message 28*j* to the network node "H", the arc merge solicitation message 28*j* specifying the source ("E"), the destination ("H"), the merging arc identifier ("A2"), the root identifier ("R"), and the height "H2=2".

The junction node "H" of the buttressing arc "A3" 18 can respond to the arc merge solicitation message 28*j* by surrendering its corresponding arc cursor of the buttressing arc A3 to become another of the junction nodes for the arc A2 in step 52d of FIG. 4C, and responding with a unicast arc merge acknowledgment message (AMAM) 28k (FIG. 3). Hence, the junction node "E" in step 54b can mark the node "H" having sent the arc merge acknowledgment message 28k as part of the existing arc "A2" on the reversible link "H→E (Rev)", enabling the junction node "E" to assume control of the buttressing arc A3 can selectively pass the corresponding arc cursor of the arc A2 to the newly added junction node "H" for reversal of the reversible link "H→E (Rev)" as needed. The merging of the arc "A2" and the buttressing arc "A3" is illustrated in FIG. 5 as the multipath routing arc "MA0" 19 comprising the backbone junction nodes "E" and "H" coupled by the reversible link "H→E (Rev)", and the exit nodes "C" and "F": the arc cursor (currently owned by the backbone junction node "E") can be transferred between the backbone junction nodes "E" and "H", as needed.

Similar to node "H", the network node "D" can form a second buttressing arc "A4" having a corresponding originating end joined to the junction node "E", and a corresponding terminating end joined to the junction node "A" of the root arc "A1" having the height "H1=1" less than the height of the originating junction node "E" ("H2=2").

Figure 7E:
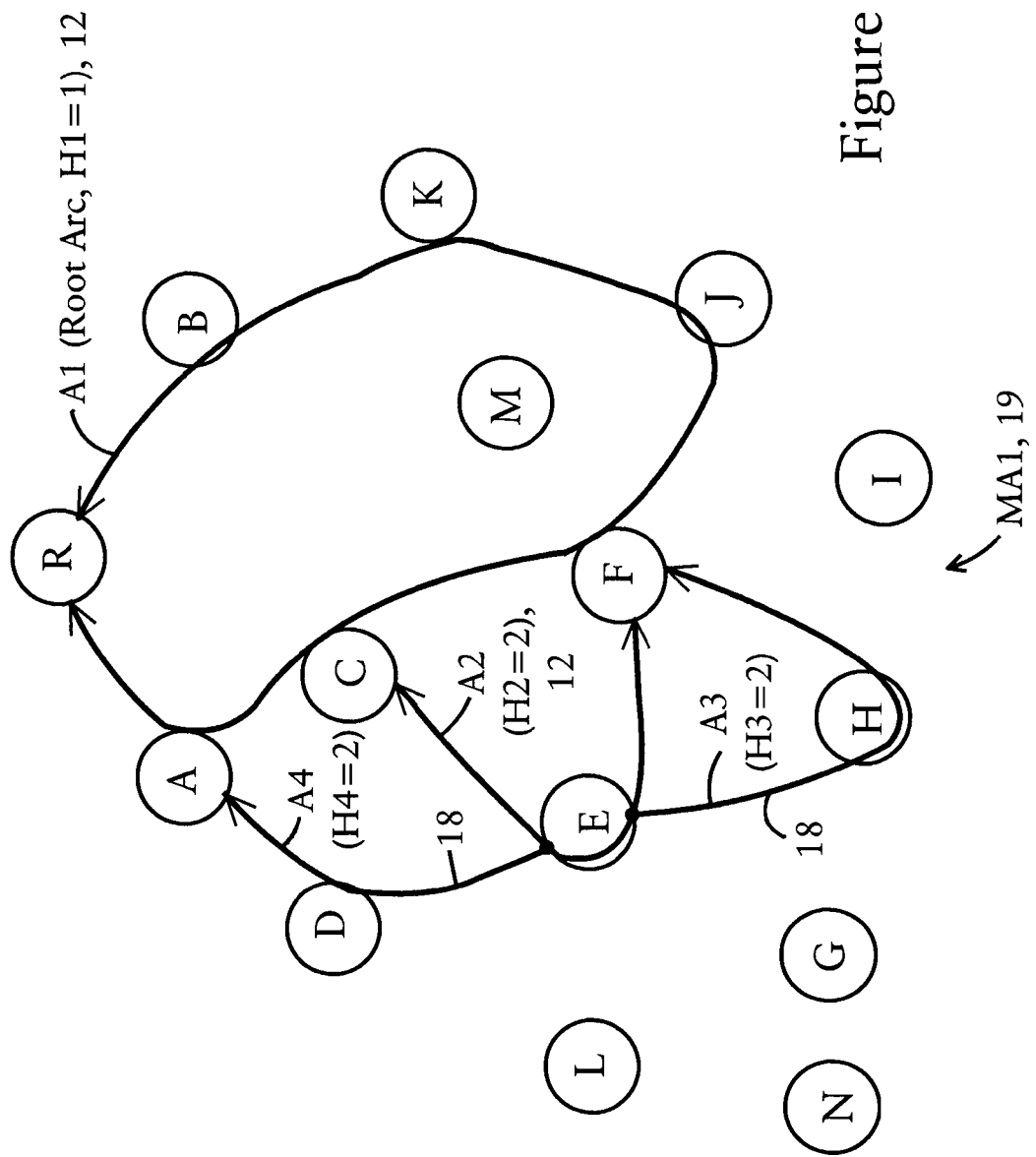
Figure 7F:
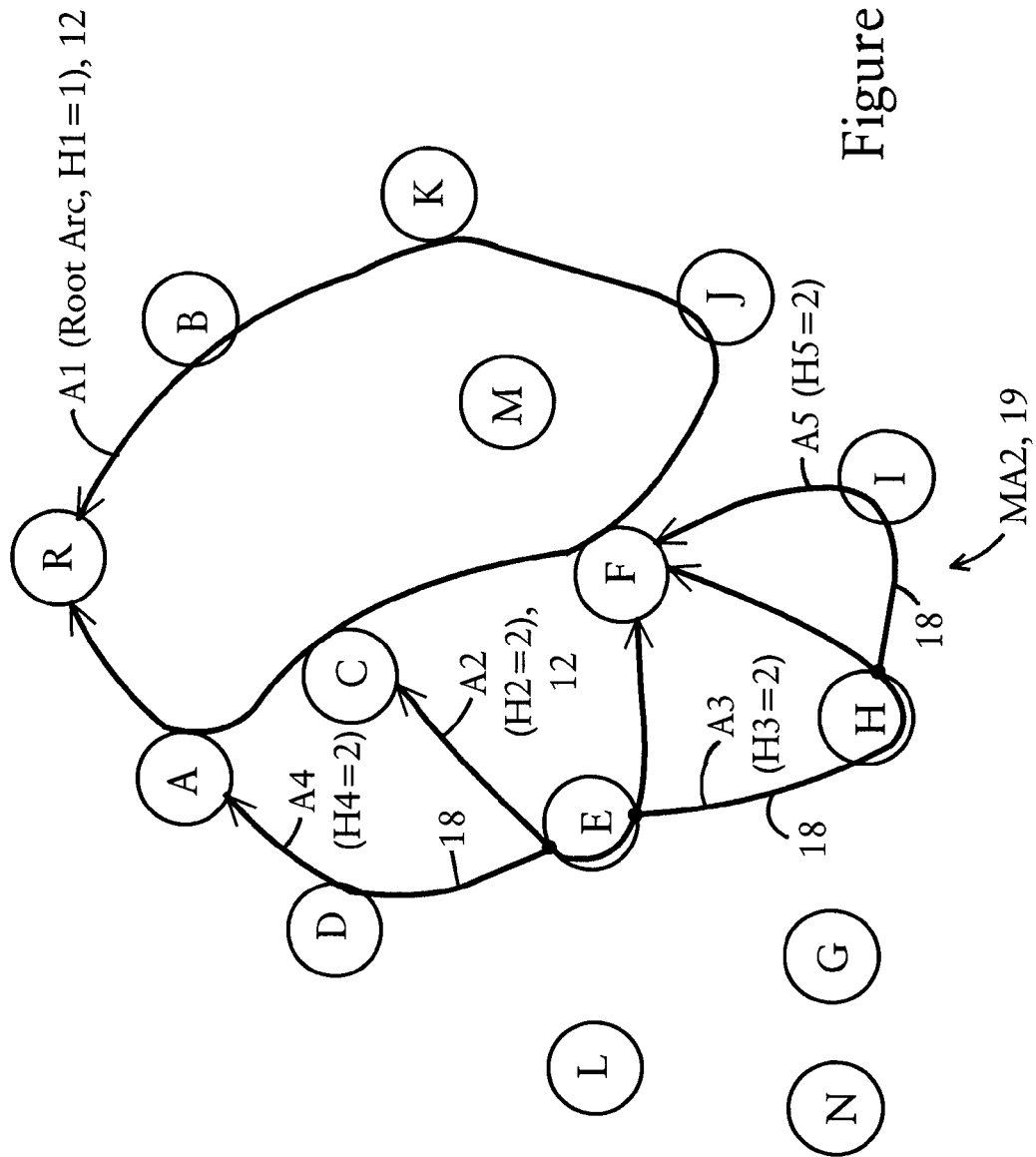

Referring to FIG. 7E, the network node "D" can identify in event 38 of FIG. 4A that it is a junction node in response to detecting in step 40c of FIG. 4A the multicast arc junction advertisement messages 28i from the arc junction nodes (i.e., safe nodes) "E" and "A"; the network node "D" also can identify in step 52 of FIG. 4C that it can form a buttressing arc based on identifying the arc junction nodes "E" and "A" advertising the unequal heights of "H2=2" and "H1=1", respectively. Hence, the junction node "D" in step 52a of FIG. 4C and step 114 of FIG. 6B can update its routing table with the reachability to the root "R" via the unequal height non-congruent paths "E" and "A" as described above with respect to node "H" and can send in step 52a of FIG. 4C and step 114 of FIG. 6B a unicast buttressing arc solicitation message 28f to at least the higher cost safe node "E", specifying a proposed height that inherits the height of the highest cost node (i.e., "H4=H2=2").

The network node "E", in response to receiving the buttressing arc solicitation message 28f from the junction node "D", responds as described above with respect to the buttressing arc solicitation message 28f from the junction node "H" and decide to form the buttressing arc "A4" by responding to the network node "D" with a buttressing arc acceptance message (BAAM) 28g, and identify the connecting link as reversible "E→D (Rev)" in step 114a. The junction node "D" responds in step 52b of FIG. 4C to the buttressing arc acceptance message 28g by updating its routing table to identify the buttressing arc "A4", and initiating multicast of arc junction advertisement messages 28i advertising the new buttressing arc "A4" 18 at a height of "H3=2", illustrated in FIGS. 5, 7E, and 8 (the terminating end "A" of the buttressing arc "A4" cannot send any packets toward the junction node "D" in order to avoid formation of any loops).

As described above with respect to the buttressing arc "A3", the network node "E" in step 54 of FIG. 4C identifies itself as the originating end of the buttressing arc "A4" 18, and in response sends in step 54a of FIG. 4C a unicast arc merge solicitation message 28j to the network node "D". The junction node "D" of the buttressing arc "A4" 18 can respond to the arc merge solicitation message 28j by surrendering its corresponding arc cursor of the buttressing arc A4 to become another of the junction nodes for the multipath routing arc MA0 19 in step 52d of FIG. 4C, and responding with a unicast arc merge acknowledgment message (AMAM) 28k (FIG. 3). Hence, the junction node "E" in step 54b can mark the node "D" having sent the arc merge acknowledgment message 28k as merging with the existing multipath routing arc "MA0" on the reversible link "E→D (Rev)", enabling the junction node "E" to assume control of the buttressing arc A4 can selectively pass the corresponding arc cursor of the multipath routing arc "MA0" to the newly added junction node "D" for reversal of the reversible link "E→D (Rev)" as needed. The merging of the multipath routing arc "MA0" and the buttressing arc "A4" is illustrated in FIG. 5 as the merged arc "MA1" comprising the backbone junction nodes "D", "E" and "H", and the exit nodes "A", "C" and "F": the arc cursor (currently owned by the backbone junction node "E") can be transferred between the backbone junction nodes "D", "E" and "H", as needed.

Similar to nodes "H" and "D" joining the originating junction node "E", the network node "I" can form a third buttressing arc "A5" having a corresponding originating end joined to the junction node "H", and a corresponding terminating end joined to the junction node "F" of the root arc "A1" having the height "H1=1" less than the height of the originating junction node "H" ("H2=2"). The network node "I" can identify in event 38 of FIG. 4A that it is a junction node in response to the multicast arc junction advertisement messages 28i from the arc junction nodes (i.e., safe nodes) "H" and "F", and identify in step 52 of FIG. 4C that it can form a buttressing arc based on identifying the arc junction nodes "H" and "F" advertising the unequal heights of "H3=2" and "H1=1", respectively. Hence, the junction node "I" in step 52a of FIG. 4C and step 114 of FIG. 6B can update its routing table with the reachability to the root "R" via the unequal height non-congruent paths "H" and "F", and send in step 52a of FIG. 4C and step 114 of FIG. 6B a unicast buttressing arc solicitation message 28f to at least the higher cost safe node "H". The network node "H", in response to receiving the buttressing arc solicitation message 28f from the junction node "I", can decide to form the buttressing arc "A5" by sending a buttressing arc acceptance message (BAAM) 28g to the network node "I", and identify in step 114a the connecting link as reversible "I→H (Rev)" (see FIG. 8). The junction node "I" responds in step 52b of FIG. 4C to the buttressing arc acceptance message 28g by updating its routing table to identify the buttressing arc "A5", and initiating multicast of arc junction advertisement messages 28i advertising the new buttressing arc "A5" 18 at a height of "H5=4", illustrated in FIGS. 5, 7F, and 8 (the terminating end "F" of the buttressing arc "A5" cannot send any packets toward the junction node "I" in order to avoid formation of any loops).

As described above with respect to the buttressing arcs "A3" and "A4", the network node "H" in step 54 of FIG. 4C identifies itself as the originating end of the buttressing arc "A5" 18, and in response sends in step 54a of FIG. 4C a unicast arc merge solicitation message 28j to the network node "I", causing the junction node "I" to surrender its corresponding arc cursor of the buttressing arc A5 to become another of the junction nodes for the multipath routing arc MA1 19 in step 52d of FIG. 4C, and responding with a unicast arc merge acknowledgment message (AMAM) 28k (FIG. 3). Hence, the junction node "H" in step 54b can mark the node "I" having sent the arc merge acknowledgment message 28k as merging with the existing multipath routing arc "MA1" on the reversible link "I→H (Rev)", resulting in the multipath routing arc "MA2" comprising the backbone junction nodes "D", "E", "H", and "I", and the exit nodes "A", "C" and "F": the arc cursor (currently owned by the backbone junction node "E") can be transferred between the backbone junction nodes "D", "E" "H", and "I" as needed.

Figure 7G:
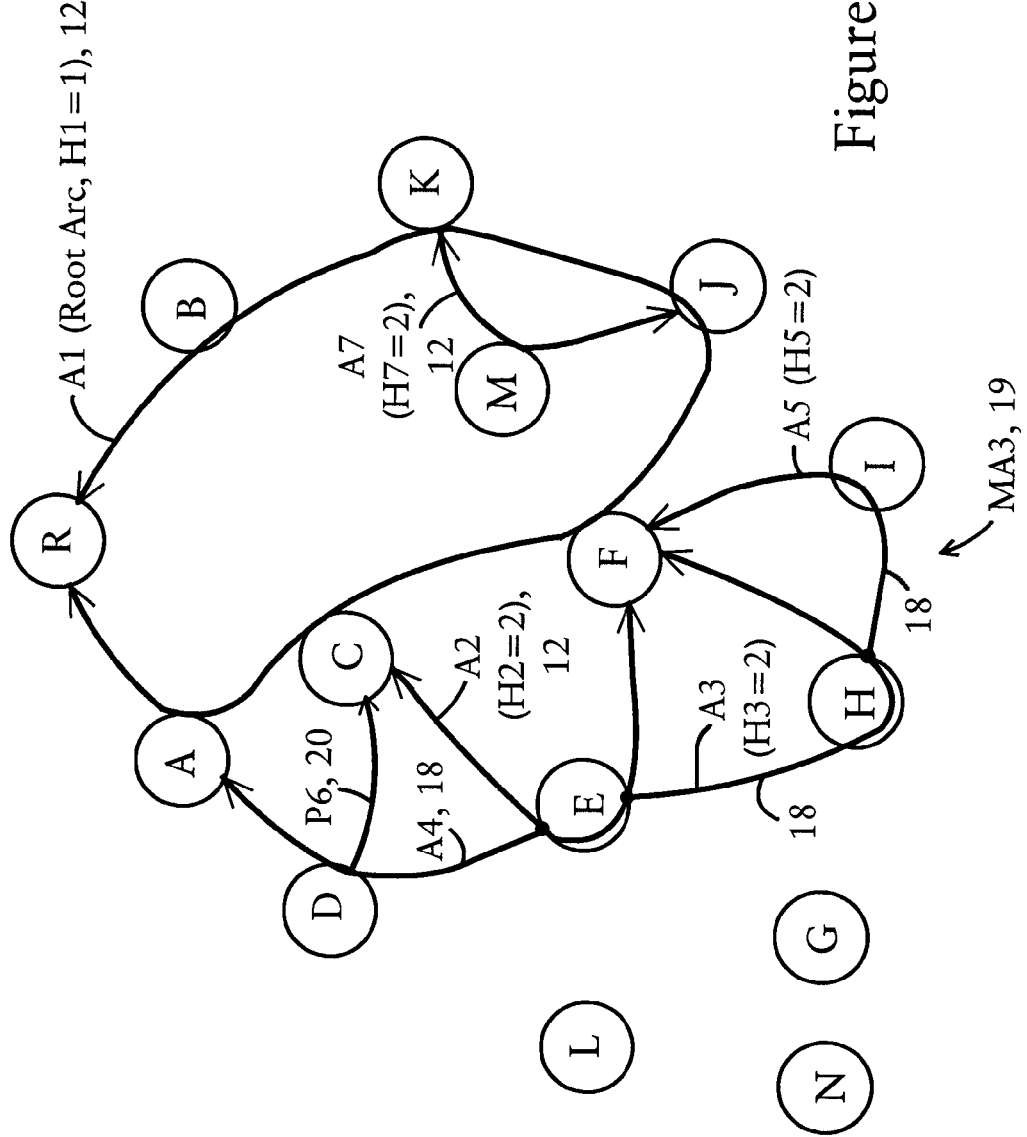

Referring to FIG. 7G, the junction node "D" in step 50*d* can add a buttressing path "P6" 20 in response to the advertising junction node "C" multicasting the multicast arc junction advertisement message 28*i* specifying the corresponding height "H1=1" of the root arc "A1" that is less than the corresponding height "H2=2" of the multipath routing arc "MA2" 19. Hence, the junction node "D" gains an additional exit node "C" for routing network traffic toward the root "R".

As described above with respect to the node "E", the nodes "M", "L", and "G" can form the respective collapsed arcs "A7", "A8", and "A9" in response to detecting multicast arc junction advertisement messages 28*i*.

Figure 7H:
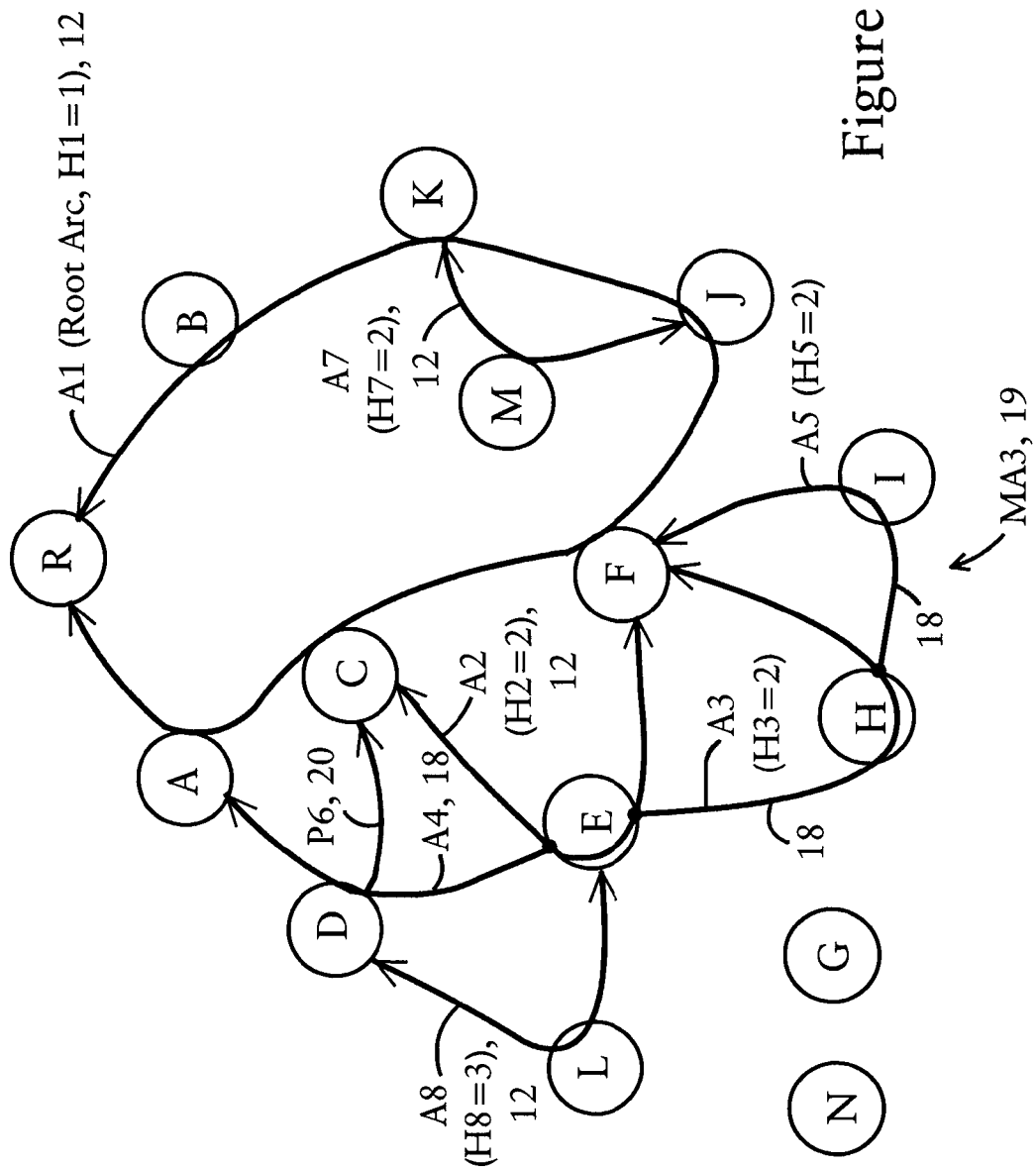

As illustrated in FIGS. 5 and 7H, the network node "M" can detect the multicast arc junction advertisement messages 28*i* from the safe nodes "J" and "K" in the root arc "A1" 12 advertising a height of "H1=1" and form the collapsed arc "A7" in steps 38, 40*c* (FIG. 4A), 50, 50*b* (FIG. 4B), and 116 (FIG. 6B). Similarly, the network node "L" can detect the multicast arc junction advertisement messages 28*i* from the safe nodes "D" and "E" in the multipath routing arc "MA2" 19 advertising a height of "H2=2" and form the collapsed arc "A8" (height H8=3) in steps 38, 40*c* (FIG. 4A), 50, 50*b* (FIG. 4B), and 116 (FIG. 6B).

Figure 7I:
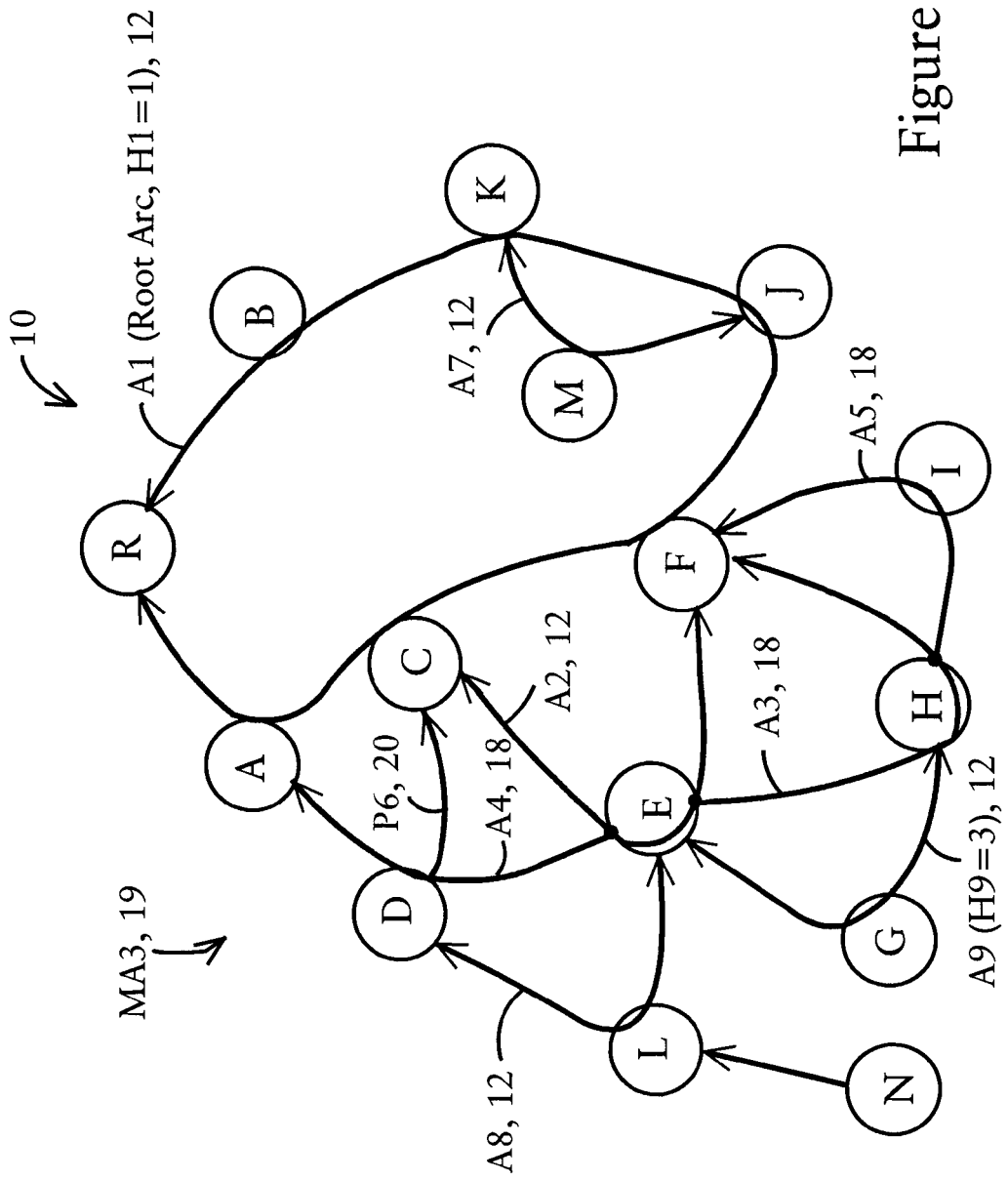

As illustrated in FIGS. 5 and 7I, the network node "G" can detect the multicast arc junction advertisement messages 28*i* from the safe nodes "E" and "H" in the multipath routing arc "MA2" 19 advertising a height of "H2=2" and form the collapsed arc "A9" (height H9=4) in steps 38, 40*c* (FIG. 4A), 50, 50*b* (FIG. 4B), and 116 (FIG. 6B). The completion of the collapsed arc "A9" completes the loop-free routing topology of FIG. 8. Hence, network traffic can be forwarded to the destination device "R" via a buttressing arc (e.g., "A3") 18 and either a first routing arc (e.g., "A2") joined to the originating end "E" of the buttressing arc, or a second routing arc (e.g., "A1") joined at the terminating end "F" of the buttressing arc.

As apparent from the foregoing, the network nodes 16 can independently establish routing arcs. Conflicts are avoided based on ensuring that a given node attempts to create one arc at a time: any received advertisement messages or solicitation messages for another arc are placed in a queue until processing for the currently arc is completed, either in the form of a completed arc or failure in completing an arc. Depending on the state of a network node 16 in forming a routing arc, a network node can output a reject message if needed, for example a unicast arc reject message 28*d* (in response to a unicast arc solicitation message 28*b*), a buttressing arc reject message 28*h* (in response to a buttressing arc solicitation message 28*f*), or an arc merge reject message 28*l* (in response to a unicast arc merge solicitation message). Timeout mechanisms also can be employed to ensure a network node does not waste an inordinate amount of time waiting for an acknowledgement.

Although the Figures illustrate only the network nodes 16 that build the loop-free routing topology, other nodes (not shown) may be included within the routing arcs 12 buttressing arc 18, or buttressing paths 20 that do not execute any routing decision other than forwarding a packet along the arc or path. For example, the buttressing path P6 20 may have one or more nodes in between nodes D and C that pass network traffic from node D to node C, for example a "chain" of nodes along the path P6 20. Similarly, any routing arc 12 or buttressing arc can have additional nodes along the arc that do not execute any routing decision other than forwarding a packet along the arc 12 or 18; hence, one or more nodes may form a "chain" in between nodes H and I, E and F, C and F, etc., that are "along the path".

The multipath routing arc (e.g., MA3) 19 of FIGS. 7G-I and FIG. 8 provides robust stability in providing a routing path to the destination root R 14, even in the present of unstable paths (e.g., in an ad hoc network), where network traffic can be moved along backbone junction nodes D, E, H, I in the event of a failure in reaching any of the exit nodes A, C, F. Assume an example data packet is output from the arc cursor node "E" can be sent along the arc A2 to exit node C, however exit node C is unreachable (e.g., a node in between nodes E and C has failed): in response to the data packet being returned to the arc cursor node E (e.g., a node in between E and C returns the packet with a designation that the destination C is unreachabe), the arc cursor node E can forward the data packet to backbone junction node D via A4. The backbone junction node D can send the packet to exit node C via the buttressing path P6 20: if exit node C is unreachable (e.g., a node in between nodes D and C has failed, or exit node C has failed), the backbone junction node D can send the data packet to exit node A. If both exit nodes A and C are unreachable by backbone junction node D, the backbone junction node D can return the data packet to arc cursor node E with a designation that the data packet was rerouted due to a link failure.

The arc cursor node E, in response to receiving the rerouted data packet with the reroute designation from the backbone junction D, can forward the data packet via A3 to backbone junction H (e.g., assume arc cursor node E detects that the exit node F is unreachable via the path A2 containing zero or more nodes in between E and F). If backbone junction H determines that the exit node F is unavailable via A3, the backbone junction H will not forward the packet back to the arc cursor node E in response to detecting the reroute designation, and thus avoid a loop; rather, the backbone junction H responds to the unreachability of exit node F by forwarding the packet to the backbone junction node I. Assuming the node I still can reach the exit node F, the packet can be forwarded toward the root R via exit node F, despite any failures encountered in the paths H→F, E→F, E→C, D→C, or D→A.

Hence, the disclosed multipath routing arc 19 enables nodes within an arc to instantaneously reroute a packet in response to a detected unreachability of an exit node, based on adding a reroute designation to the rerouted packet to avoid loop formation. Hence, packets can be rerouted before a junction node has obtained possession of an arc cursor.

According to the disclosed embodiments, network devices operating as network nodes in a computing network can automatically and independently establish a loop free routing topology using routing arcs in an ad hoc manner, including forming buttressing arcs that join to existing arcs, and merging the buttressing arcs into the existing arcs to form multipath routing arcs, providing extended control using a movable arc cursor among the backbone junction nodes of the multipath routing arc.

According to example embodiments, a loop-free routing topology can be established that comprises multipath routing arcs, enabling network traffic to be redirected instantaneously in response to a detected failure in the routing topology based on reversing a reversible link, without introducing any loops into the topology.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

creating, in a computing network, a loop-free routing topology comprising a plurality of routing arcs for reaching a destination device, each routing arc routing any network traffic along the routing arc toward the destination device and exiting via any one of first or second ends of the corresponding routing arc for non-congruent paths to the destination device, the creating including forming a multipath routing arc based on merging a first of the routing arcs with a buttressing arc having an originating end joined to the first routing arc and a terminating end joined to a second of the routing arcs, the buttressing arc inheriting from the first routing arc a first height to the destination device, the first height of the first routing arc higher than a corresponding second height of the second routing arc, the multipath routing arc having three or more distinct routing paths for reaching the destination based on exiting via the first end of the first routing arc, the second end of the first routing arc, or the terminating end of the buttressing arc; and causing the network traffic to be forwarded, to the destination device, via the buttressing arc and at least one of the first routing arc or the second routing arc.

2. The method of claim 1, wherein the multipath routing arc includes at least two junction nodes coupled by a reversible link.

3. The method of claim 2, wherein the merging is based on a junction node in the first arc detecting itself as the originating end of the buttressing arc.

4. The method of claim 3, wherein each routing arc comprises one and only one arc cursor that provides exclusive control for directing network traffic away from any network device having possession of the arc cursor, the merging includes a network device of the buttressing arc surrendering a corresponding arc cursor of the buttressing arc to become a first of the junction nodes and to enable control by the corresponding arc cursor of the first arc, enabling a second of the junction nodes to selectively pass the corresponding arc cursor of the first arc to the first junction node for reversal of the reversible link.

5. The method of claim 2, further comprising:

forming a second buttressing arc having a corresponding originating end joined to one of the junction nodes of the multipath routing arc and a corresponding terminating end joined to any routing arc having the corresponding height less than the first height; and merging the second buttressing arc to the multipath routing arc, enabling addition of another junction node to the multipath routing arc.

6. The method of claim 5, wherein the merging of the second buttressing arc into the multipath routing arc enables movement of an arc cursor, providing exclusive control of directing the network traffic along the multipath routing arc away from any network device having possession thereof, to any of the junction nodes of the multipath routing arc.

7. The method of claim 2, further comprising adding to the multipath routing arc, by at least one of the junction nodes, a buttressing path as one of the distinct routing paths in response to an advertising junction node of another one of the routing arcs advertising a corresponding height less than the corresponding height of the multipath routing arc.

8. The method of claim 1, wherein the buttressing arc is formed based on:

a network device detecting a first network device of the first routing arc advertising the first height;

the network device detecting a second network device of the second routing arc advertising the second height; and the network device designating the first network device as the originating end based on the first routing arc having the first height greater than the second height, and designating the second network device as the terminating end, enabling the network traffic to be forwarded via the network device to one of the originating end or the terminating end.

9. The method of claim 1, wherein each routing arc comprises a first network device as a first end of the routing arc, a second network device as a second end of the routing arc, and at least a third network device configured for routing any of the network traffic along the routing arc toward the destination device via any one of the first or second ends of the routing arc.

10. An apparatus comprising:

a network interface circuit configured for receiving advertisement messages from network devices in a computing network, the advertisement messages advertising respective costs for reaching a destination device; and a processor circuit configured for operating the apparatus as one of the network devices in the computing network, the processor circuit configured for communicating with the network devices for creating, in the computing network based on the advertisement messages, a loop-free routing topology comprising a plurality of routing arcs for reaching the destination device, each routing arc routing any network traffic along the routing arc toward the destination device and exiting via any one of first or second ends of the corresponding routing arc for non-congruent paths to the destination device, the processor circuit further configured for forming a multipath routing arc based on merging a first of the routing arcs with a buttressing arc having an originating end joined to the first routing arc and a terminating end joined to a second of the routing arcs, the buttressing arc inheriting from the first routing arc a first height to the destination device, the first height of the first routing arc higher than a corresponding second height of the second routing arc, the multipath routing arc having three or more distinct routing paths for reaching the destination based on exiting via the first end of the first routing arc, the second end of the first routing arc, or the terminating end of the buttressing arc;

wherein the network traffic can be forwarded, to the destination device, via the buttressing arc and at least one of the first routing arc or the second routing arc.

11. The apparatus of claim 10, wherein the processor circuit is configured for including in the multipath routing arc at least two junction nodes coupled by a reversible link, the apparatus operating as a first of the junction nodes.

12. The apparatus of claim 11, wherein the merging is based on the apparatus in the first arc detecting itself as the originating end of the buttressing arc.

13. The apparatus of claim 12, wherein each routing arc comprises one and only one arc cursor that provides exclusive control for directing network traffic away from any network device having possession of the arc cursor, the merging includes a network device of the buttressing arc surrendering a corresponding arc cursor of the buttressing arc to become a second of the junction nodes and to enable control by the corresponding arc cursor of the first arc, enabling the apparatus as the first junction node to selectively pass the corresponding arc cursor of the first arc to the second junction node for reversal of the reversible link.

14. The apparatus of claim 11, wherein the processing circuit further is configured for:
  forming a second buttressing arc having a corresponding originating end joined to the apparatus as a first the junction nodes of the multipath routing arc and a corresponding terminating end joined to any routing arc having the corresponding height less than the first height; and
  merging the second buttressing arc to the multipath routing arc, enabling addition of another junction node to the multipath routing arc.

15. The apparatus of claim 14, wherein the merging of the second buttressing arc into the multipath routing arc enables movement of an arc cursor, providing exclusive control of directing the network traffic along the multipath routing arc away from any network device having possession thereof, to any of the junction nodes of the multipath routing arc.

16. The apparatus of claim 11, wherein the processor circuit is configured for adding to the multipath routing arc a buttressing path as one of the distinct routing paths in response to an advertising junction node of another one of the routing arcs advertising a corresponding height less than the corresponding height of the multipath routing arc.

17. The apparatus of claim 10, wherein the processor circuit is configured for forming the buttressing arc based on:
  detecting a first network device of the first routing arc advertising the first height;
  detecting a second network device of the second routing arc advertising the second height; and
  designating the first network device as the originating end based on the first routing arc having the first height greater than the second height, and designating the second network device as the terminating end, enabling the network traffic to be forwarded by the apparatus to one of the originating end or the terminating end.

18. The apparatus of claim 10, wherein each routing arc comprises a first network device as a first end of the routing arc, a second network device as a second end of the routing arc, and at least a third network device configured for routing any of the network traffic along the routing arc toward the destination device via any one of the first or second ends of the routing arc.

19. Logic encoded in one or more non-transitory tangible media and when executed causes a processor to:
  create, in a computing network, a loop-free routing topology comprising a plurality of routing arcs for reaching a destination device, each routing arc routing any network traffic along the routing arc toward the destination device and exiting via any one of first or second ends of the corresponding routing arc for non-congruent paths to the destination device, the creating including forming a multipath routing arc based on merging a first of the routing arcs with a buttressing arc having an originating end joined to the first routing arc and a terminating end joined to a second of the routing arcs, the buttressing arc inheriting from the first routing arc a first height to the destination device, the first height of the first routing arc higher than a corresponding second height of the second routing arc, the multipath routing arc having three or more distinct routing paths for reaching the destination based on exiting via the first end of the first routing arc, the second end of the first routing arc, or the terminating end of the buttressing arc; and
  cause the network traffic to be forwarded, to the destination device, via the buttressing arc and at least one of the first routing arc or the second routing arc.

20. The logic of claim 19, wherein the multipath routing arc includes at least two junction nodes coupled by a reversible link.

\* \* \* \* \*